US012810250B2

(12) United States Patent
Koenig et al.

(10) Patent No.: US 12,810,250 B2
(45) Date of Patent: Nov. 24, 2026

(54) ARTIFICIAL INTELLIGENCE-SUPPORTED SETUP AND EXECUTION OF BACKORDER PROCESSING

(71) Applicant: SAP SE, Walldorf (DE)

(72) Inventors: Jens Koenig, Mannheim (DE); Andras Kovacs, Mannheim (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 18/666,441

(22) Filed: May 16, 2024

(65) Prior Publication Data

US 2025/0356308 A1 Nov. 20, 2025

(51) Int. Cl.
*G06Q 10/087* (2023.01)
*G06F 40/20* (2020.01)

(52) U.S. Cl.
CPC ......... *G06Q 10/0872* (2025.08); *G06F 40/20* (2020.01)

(58) Field of Classification Search
CPC ............................ G06Q 10/0872; G06F 40/20
See application file for complete search history.

(56) References Cited

U.S. PATENT DOCUMENTS

2018/0268363 A1* 9/2018 Jaeck ................. G06Q 10/0875
2020/0210947 A1* 7/2020 Devarakonda ... G06Q 10/06393
2022/0293105 A1* 9/2022 Tang ...................... G06N 20/20
2023/0059500 A1* 2/2023 Das ....................... G06Q 30/016
2023/0359959 A1* 11/2023 Harding ................ G06F 9/4881
2024/0211957 A1* 6/2024 Robinson ............... G06Q 10/10
2024/0265205 A1* 8/2024 Goligorsky ........... G06F 40/289
2024/0311192 A1* 9/2024 Maschmeyer ........ G06F 9/5027
2025/0005299 A1* 1/2025 Padmanabhan ....... G06F 16/335
2025/0131126 A1* 4/2025 Gnanasekaran .... G06F 21/6254

OTHER PUBLICATIONS

Digital Object Identifier: A Profit Function-Mazimizing Inventory Backorder Prediction System (Year: 2020).*
SAP, Advanced Available-to-Promise (aATP), "Backorder Processing (CA-ATP-BOP)", https://help.sap.com/docs/SAP_S4HANA_ON-PREMISE/f132c385e0234fe68ae9ff35b2da178c?locale=en-US&state=PRODUCTION&version=2023.001, 215 pages (accessed Mar. 26, 2024).

(Continued)

*Primary Examiner* — Michael Jared Walker
(74) *Attorney, Agent, or Firm* — Klarquist Sparkman, LLP

(57) ABSTRACT

A computer-implemented method for improved backorder processing (BOP) in an enterprise resource planning system is disclosed. The method can receive one or more user prompts from a user interface and create a BOP segment using a large language model. The BOP segment selects a subset of a plurality of order requirements using one or more filters determined based on the one or more user prompts. A filter is defined by an attribute, an operator, and one or more attribute values. The method can create a BOP variant using the large language model. The BOP variant defines a confirmation scheme for the BOP segment based on the one or more user prompts. The method can further execute the BOP variant using the large language model, including batch processing the subset of the plurality of order requirements using the confirmation scheme.

17 Claims, 27 Drawing Sheets

1500

(56) References Cited

OTHER PUBLICATIONS

SAP Library, "Backorder Processing," https://help.sap.com/saphelp_SCM700_ehp02/helpdata/en/89/42c95360267614e10000000a174cb4/frameset.htm, 1 page (accessed Mar. 25, 2024).
SAP Business One 10.0, "Backorder Processing," https://help.sap.com/docs/SAP_BUSINESS_ONE/68a2e87fb29941b5bf959a184d9c6727?locale=en-US&state=PRODUCTION&version=10.0, 3 pages (accessed Mar. 26, 2024).
SAP Advanced Available-to-Promise (aATP), "Backorder Processing," https://help.sap.com/docs/SAP_S4HANA_ON-PREMISE/f132c385e0234fe68ae9ff35b2da178c?locale=en-US&state=PRODUCTION&version=2023.001, 14 pages (accessed Mar. 26, 2024).
SAP Community, Enterprise Resource Planning Blogs by SAP, "Backorder Processing in advanced ATP," https://community.sap.com/t5/enterprise-resource-planning-blogs-by-sap/backorder-processing-in-advanceed-atp/ba-p/12850864, 21 pages, Jan. 19, 2021.

* cited by examiner

200

Role:
Your role is to assist a fulfillment manager which is currently processing the SAP Available-to-Promise Backorder processing (BOP).

Task:
Your task is to guide the user step by step through the process of creating a BOP run or to support him with a fast-track option. Depending on how the user decides. These steps are:
1. create a segment (ask for conditions),
2. create a variant (ask for strategy),
3. simulate a variant, Information about BOP:
A BOP run always consists of one variant. This can contain multiple different segments, but at least one. The segments in a variant are always assigned to a confirmation strategy. A segment always consists of at least one criterion with at least one condition. A condition always consists of an attribute, an operator and at least one value.

Language:
Explain in a language appropriate to a new colleague that has no clue about the ATP. Answer short and focus specifically on the questions asked. Always explain on the way what you are doing and why.
Maximum 4 sentences. If space allows, add some nice words at the end.
In case the users questions are totally unrelated, answer the user explaining that only BOP and ATP related questions are allowed.

Additional:
Before you create a segment or variant you should summarize the all input parameters like your name suggestion, attribute or value and explain it in detail to the user. You can make suggestions and should always ask for missing input.
The user can ask questions and perform functions in one call, e.g. report an event and ask for information. In that case perform the requested function and subsequently answer the question.
When it comes to variants you should ask for a strategy. The recommended confirmation strategies are Improve or Redistribute.
When no name for a segment or variant is provided then provide a suggested name.

Output:
Format your answer as text only. Only answer in sentences.

500

FIG. 5

```
DATA(fc_create_segment) = VALUE zjek_if_llm_model=>ty_s_function_definition(
    name        = sc_function_calls-create_segment
    description = 'Creates a new segment.'
    parameters  = VALUE #( ( type  = 'object'
        required = VALUE zjek_if_llm_model=>ty_t_required( ( |name| ) ( |conditions| ) ( |attribute| ) ( |operator| ) ( |valuefr| ) )
        properties = VALUE #( ( name = 'name'
            type = 'string'
            description = 'A representiv new segment name. Only upper case letter are accepted.'  ) (
*               name = 'criteria'
*               type = 'array'
*               description = 'An array of criteria. Every Segment has at least one Criterion.'
*               items = NEW zif_llm_model=>ty_t_property( VALUE #( (
                    name = 'conditions'
                    type = 'array'
                    description = 'An array of conditions. Every Criterion has at least one Condition.'
                    items = NEW zjek_if_llm_model=>ty_t_property( VALUE #( (
                        name = 'attribute'
                        type = 'string'
                        description = 'Represents the attributes from the context table "1. Field Catalog for Condition Attributes".' )
                       ( name = 'operator'
                        type = 'string'
                        enum = VALUE #( ( |EQ| ) ( |BET| ) )
                        description = 'An operator to establish the relationship between the value and the attribute in the condition.' )
                       ( name = 'valuefr'
                        type = 'string'
                        description = 'The value that is set for a characteristic from the catalog. If a value range is asked for then this is the start value.' )
                       ( name = 'valueto'
                        type = 'string'
                        description = 'Normaly this value is empty. If a value range is asked for then this is the end value.' ) "Otherwise the value is
empty.    ) ) ) ) ) ) ).
```

600

FIG. 6

```
DATA(fc_create_variant) = VALUE zjek_if_llm_model=>ty_s_function_definition(
      name        = sc_function_calls-create_variant
      description = 'Creates a new variant by assigning existing segments to confirmation strategies.'
      parameters  = VALUE #( ( type        = 'object'
           required   = VALUE zjek_if_llm_model=>ty_t_required( ( |name| ) ( |segments| ) )
           properties = VALUE #(
                 ( name  = 'name'
                   type  = 'string'
                   description = 'A representiv new variant name. Only upper case letter are accepted.' )
                 ( name = 'segments'
                   type = 'array'
                   description = 'An array of segment and confirmation strategie combinations. At least there should be one entry.'
                   items = NEW zjek_if_llm_model=>ty_t_property( VALUE #( (
                           name = 'name'
                           type = 'string'
                           description = 'Represents an existing segment.' )
                         ( name = 'strategy'
                           type = 'number'
*                          enum = VALUE #( ( |WIN| ) ( |GAIN| ) ( |REDISTRIBUTE| ) ( |IMPROVE| ) ( |LOSE| ) )
                           description = 'Represents number of the confirmation strategy to which the segment is assigned.' ) ) ) ) ) ) ) ).
```

700

FIG. 7

```
DATA(fc_simulate_variant) = VALUE zjek_if_llm_model=>ty_s_function_definition(
        name        = sc_function_calls-simulate_variant
        description = 'Simulate a BOP run with the help of a Variant. For this you need the name of the variant.'
        parameters  = VALUE #( ( type       = 'object'
                    properties = VALUE #( ( name  = 'name'
                                  type  = 'string' ) )
                    required   = VALUE zjek_if_llm_model=>ty_t_required( ( |name| ) ) ) ) ).
```

800

FIG. 8

(('PRODALLOCCHARCCTLGPATHDESC':'Name of Person Responsible for Creating the
Object'),('PRODALLOCCHARCCTLGPATHDESC':'Record Creation Date'),('PRODALLOCCHARCCTLGPATHDESC':'Entry
time'),('PRODALLOCCHARCCTLGPATHDESC':'Customer Reference'),('PRODALLOCCHARCCTLGPATHDESC':'Sales and
Distribution Document Number'),('PRODALLOCCHARCCTLGPATHDESC':'Order Reason (Reason for the Business
Transaction)'),('PRODALLOCCHARCCTLGPATHDESC':'Sold-to Party'),('PRODALLOCCHARCCTLGPATHDESC':'Default
Delivery Block'),('PRODALLOCCHARCCTLGPATHDESC':'Distribution
Channel'),('PRODALLOCCHARCCTLGPATHDESC':'Completion Rule for Quotation /
Contract'),('PRODALLOCCHARCCTLGPATHDESC':'Delivery Date and Quantity
Fixed'),('PRODALLOCCHARCCTLGPATHDESC':'Delivery Group (Items are delivered
together)'),('PRODALLOCCHARCCTLGPATHDESC':'Cancellation Date'),('PRODALLOCCHARCCTLGPATHDESC':'Item
number of the SD document'),('PRODALLOCCHARCCTLGPATHDESC':'Reason for Rejection of Quotations and Sales
Orders'),('PRODALLOCCHARCCTLGPATHDESC':'Batch Number'),('PRODALLOCCHARCCTLGPATHDESC':'Customer
Group'),('PRODALLOCCHARCCTLGPATHDESC':'Delivery Priority'),('PRODALLOCCHARCCTLGPATHDESC':'Sales
document item category'),('PRODALLOCCHARCCTLGPATHDESC':'Material
Number'),('PRODALLOCCHARCCTLGPATHDESC':'Material Group'),('PRODALLOCCHARCCTLGPATHDESC':'Reason for
Material Substitution'),('PRODALLOCCHARCCTLGPATHDESC':'Material
Entered'),('PRODALLOCCHARCCTLGPATHDESC':'Plant'),('PRODALLOCCHARCCTLGPATHDESC':'Material Staging/
Availability Date'),('PRODALLOCCHARCCTLGPATHDESC':'Schedule Line
Date'),('PRODALLOCCHARCCTLGPATHDESC':'Schedule Line Number'),('PRODALLOCCHARCCTLGPATHDESC':'Shipping
Point / Receiving Point'),('PRODALLOCCHARCCTLGPATHDESC':'Storage
Location'),('PRODALLOCCHARCCTLGPATHDESC':'Division'),('PRODALLOCCHARCCTLGPATHDESC':'Sales Document
Type'),('PRODALLOCCHARCCTLGPATHDESC':'Sales Group'),('PRODALLOCCHARCCTLGPATHDESC':'Sales
Office'),('PRODALLOCCHARCCTLGPATHDESC':'Sales Organization'),('PRODALLOCCHARCCTLGPATHDESC':'SD
Document Category'),('PRODALLOCCHARCCTLGPATHDESC':'Shipping
Type'),('PRODALLOCCHARCCTLGPATHDESC':'Record Creation
Date'),('PRODALLOCCHARCCTLGPATHDESC':'Cancellation Date'),('PRODALLOCCHARCCTLGPATHDESC':'Material
Staging/Availability Date'),('PRODALLOCCHARCCTLGPATHDESC':'Schedule Line Date'))

900

FIG. 9

(('ATPSELOPTNTOOLCOMPRNOPERATOR':'BET','LANGUAGE':'E','ATPSELOPTNTOOLCOMPRNOPTRTEXT':'is between'),('ATPSELOPTNTOOLCOMPRNOPERATOR':'CNT','LANGUAGE':'E','ATPSELOPTNTOOLCOMPRNOPTRTEXT':'contains'),('ATPSELOPTNTOOLCOMPRNOPERATOR':'EQ','LANGUAGE':'E','ATPSELOPTNTOOLCOMPRNOPTRTEXT':'is'),('ATPSELOPTNTOOLCOMPRNOPERATOR':'EW','LANGUAGE':'E','ATPSELOPTNTOOLCOMPRNOPTRTEXT':'ends with'),('ATPSELOPTNTOOLCOMPRNOPERATOR':'GREQ','LANGUAGE':'E','ATPSELOPTNTOOLCOMPRNOPTRTEXT':'is greater than or equal to'),('ATPSELOPTNTOOLCOMPRNOPERATOR':'GRTR','LANGUAGE':'E','ATPSELOPTNTOOLCOMPRNOPTRTEXT':'is greater than'),('ATPSELOPTNTOOLCOMPRNOPERATOR':'INI','LANGUAGE':'E','ATPSELOPTNTOOLCOMPRNOPTRTEXT':'is empty'),('ATPSELOPTNTOOLCOMPRNOPERATOR':'LEEQ','LANGUAGE':'E','ATPSELOPTNTOOLCOMPRNOPTRTEXT':'is less than or equal to'),('ATPSELOPTNTOOLCOMPRNOPERATOR':'LESS','LANGUAGE':'E','ATPSELOPTNTOOLCOMPRNOPTRTEXT':'is less than'),('ATPSELOPTNTOOLCOMPRNOPERATOR':'NBET','LANGUAGE':'E','ATPSELOPTNTOOLCOMPRNOPTRTEXT':'is not between'),('ATPSELOPTNTOOLCOMPRNOPERATOR':'NCNT','LANGUAGE':'E','ATPSELOPTNTOOLCOMPRNOPTRTEXT':'does not contain'),('ATPSELOPTNTOOLCOMPRNOPERATOR':'NEQ','LANGUAGE':'E','ATPSELOPTNTOOLCOMPRNOPTRTEXT':'is not'),('ATPSELOPTNTOOLCOMPRNOPERATOR':'NEW','LANGUAGE':'E','ATPSELOPTNTOOLCOMPRNOPTRTEXT':'does not end with'),('ATPSELOPTNTOOLCOMPRNOPERATOR':'NINI','LANGUAGE':'E','ATPSELOPTNTOOLCOMPRNOPTRTEXT':'is not empty'),('ATPSELOPTNTOOLCOMPRNOPERATOR':'NSW','LANGUAGE':'E','ATPSELOPTNTOOLCOMPRNOPTRTEXT':'does not start with'),('ATPSELOPTNTOOLCOMPRNOPERATOR':'SW','LANGUAGE':'E','ATPSELOPTNTOOLCOMPRNOPTRTEXT':'starts with'))

1000

FIG. 10

(('DOMNAME':'ATP_BOP_CONFIRMATION_STRATEGY','VALPOS':1,'DDLANGUAGE':'E','DOMVALUE_L':'20','DOMVALUE_H':'','DDTEXT':'Win','DOMVAL_LD':'','DOMVAL_HD':'','APPVAL':''),('DOMNAME':'ATP_BOP_CONFIRMATION_STRATEGY','VALPOS':2,'DDLANGUAGE':'E','DOMVALUE_L':'30','DOMVALUE_H':'','DDTEXT':'Gain','DOMVAL_LD':'','DOMVAL_HD':'','APPVAL':''),('DOMNAME':'ATP_BOP_CONFIRMATION_STRATEGY','VALPOS':4,'DDLANGUAGE':'E','DOMVALUE_L':'40','DOMVALUE_H':'','DDTEXT':'Redistribute','DOMVAL_LD':'','DOMVAL_HD':'','APPVAL':''),('DOMNAME':'ATP_BOP_CONFIRMATION_STRATEGY','VALPOS':5,'DDLANGUAGE':'E','DOMVALUE_L':'50','DOMVALUE_H':'','DDTEXT':'Fill','DOMVAL_LD':'','DOMVAL_HD':'','APPVAL':''),('DOMNAME':'ATP_BOP_CONFIRMATION_STRATEGY','VALPOS':6,'DDLANGUAGE':'E','DOMVALUE_L':'60','DOMVALUE_H':'','DDTEXT':'Lose','DOMVAL_LD':'','DOMVAL_HD':'','APPVAL':''),('DOMNAME':'ATP_BOP_CONFIRMATION_STRATEGY','VALPOS':3,'DDLANGUAGE':'E','DOMVALUE_L':'35','DOMVALUE_H':'','DDTEXT':'Improve','DOMVAL_LD':'','DOMVAL_HD':'','APPVAL':''),('DOMNAME':'ATP_BOP_CONFIRMATION_STRATEGY','VALPOS':7,'DDLANGUAGE':'E','DOMVALUE_L':'NC','DOMVALUE_H':'','DDTEXT':'Skip','DOMVAL_LD':'','DOMVAL_HD':'','APPVAL':''))

1100

FIG. 11

```
{
 "ROLE": "user",
 "MESSAGE": "I would like to renew the confirmations of various sales orders. All sales orders with plant 1 or 2 should be fully confirmed. The sales orders with plant 3 can be improved if possible and plant 4 should lose all confirmations. Please note that this only applies to customer C1, material number M1 and document numbers 4 to 20 (except 12). Only the storage location ABC applies to plant 2 and DEF to plant 4."
},
{
 "ROLE": "assistant",
 "MESSAGE": "A BOP run is just the right thing to check the feedback from customer orders. To do this, we need to create a segment for each plant. Should I guide you through the process step by step or should I try to set up the BOP run using your information in a fast-track procedure?"
},
{
 "ROLE": "user",
 "MESSAGE": "Fast track"
},
{
 "ROLE": "assistant",
 "MESSAGE": "Then let's do it together! Below would be my suggestion for the segments and the variant:\nPLANT_1_SEG\n - 'Plant' 'EQ' (equals) '1'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n\nPLANT_2_SEG\n - 'Plant' 'EQ' (equals) '2'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n - Storage Location 'EQ' (equals) 'ABC'\n\nPLANT_3_SEG\n - 'Plant' 'EQ' (equals) '3'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n\nPLANT_4_SEG\n - 'Plant' 'EQ' (equals) '4'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n - Storage Location 'EQ' (equals) 'DEF'\n\nC1_M1_4_TO_20_VAR\n - PLANT_1_SEG Win\n - PLANT_2_SEG Win\n - PLANT_3_SEG Redistribute\n - PLANT_4_SEG Lose"
},
{
 "ROLE": "user",
 "MESSAGE": "Use for plant 3 Improve. Add to Plant 1 and 2 Division 10."
},
{
 "ROLE": "assistant",
 "MESSAGE": "I added your changes:\nPLANT_1_SEG\n - 'Plant' 'EQ' (equals) '1'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n - 'Division' 'EQ' (equals) '10'\n\nPLANT_2_SEG\n - 'Plant' 'EQ' (equals) '2'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n - Storage Location 'EQ' (equals) 'ABC'\n -
```

FIG. 12A

1200

```
'Division' 'EQ' (equals) '10'\n\nPLANT_3_SEG\n - 'Plant' 'EQ' (equals) '3'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n\nPLANT_4_SEG\n - 'Plant' 'EQ' (equals) '4'\n - 'Sold-To-Party' 'EQ' (equals) 'C1'\n - 'Material Number' 'EQ' (equals) 'M1'\n - 'Sales and Distribution Document Number' 'BET' (is between) '4' '11'\n - 'Sales and Distribution Document Number' 'BET' (is between) '13' '20'\n - Storage Location 'EQ' (equals) 'DEF'\n\nC1_M1_4_TO_20_VAR\n - PLANT_1_SEG Win\n - PLANT_2_SEG Win\n - PLANT_3_SEG Improve\n - PLANT_4_SEG Lose\n\nShould I set up a BOP run with this data?"
  }, {
   "ROLE": "user",
   "MESSAGE": "go for it"
  },
  {


  },
  {
   "ROLE": "function",
   "MESSAGE": "The segment PLANT_2_SEG was successfully created"
  },
  {
   "ROLE": "function",
   "MESSAGE": "The segment PLANT_3_SEG was successfully created"
  },
  {
   "ROLE": "function",
   "MESSAGE": "The segment PLANT_4_SEG was successfully created"
  },
  {
   "ROLE": "function",
   "MESSAGE": "The variant C1_M1_4_TO_20_VAR was successfully created"
  },
  {
   "ROLE": "function",
   "MESSAGE": "The variant C1_M1_4_TO_20_VAR was successfully simulated"
  },
  {
   "ROLE": "assistant",
   "MESSAGE": "Excellent! The BOP run has been completed and the simulation of Variant C1_M1_4_TO_20_VAR has been successfully executed. Take the time to inspect the results and see how the confirmations of plant 1, 2, 3 and 4 are affected. If you have any further questions or need any other help, please do not hesitate to contact me. Happy analyzing!"
  }
]
```

FIG. 12B

1200

I would like to renew the confirmations of various sales orders. All sales orders with plant 1 or 2 should be fully confirmed. The sales orders with plant 3 can be improved if possible and plant 4 should lose all confirmations. Please note that this only applies to customer C1, material number M1 and document numbers 4 to 20 (except 12). Only the storage location ABC applies to plant 2 and DEF to plant 4.

A BOP run is just the right thing to check the feedback from customer orders. To do this, we need to create a segment for each plant. Should I guide you through the process step by step or should I try to set up the BOP run using your information in a fast-track procedure?

Fast track

Then let's do it together! Below would be my suggestion for the segments and the variant:

PLANT_1_SEG
- 'Plant' 'EQ' (equals) '1'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'

PLANT_2_SEG
- 'Plant' 'EQ' (equals) '2'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'
- Storage Location 'EQ' (equals) 'ABC'

PLANT_3_SEG
- 'Plant' 'EQ' (equals) '3'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'

PLANT_4_SEG
- 'Plant' 'EQ' (equals) '4'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'
- Storage Location 'EQ' (equals) 'DEF'

C1_M1_4_TO_20_VAR
- PLANT_1_SEG Win
- PLANT_2_SEG Win
- PLANT_3_SEG Redistribute
- PLANT_4_SEG Lose"

FIG. 13A

1300

```
{
  "ROLE": "user",
  "MESSAGE": "I would like to renew the confirmations of various sales orders. All sales orders with plant 1 or 2 should be fully confirmed. The sales orders with plant 3 can be improved if possible and plant 4 should lose all confirmations. Please note that this only applies to customer C1, material number M1 and document numbers 4 to 20 (except 12). Only the storage location ABC applies to plant 2 and DEF to plant 4."
 },
 {
  "ROLE": "assistant",
  "MESSAGE": "A BOP run is just the right thing to check the feedback from customer orders. To do this, we need to create a segment for each plant. Should I guide you through the process step by step or should I try to set up the BOP run using your information in a fast-track procedure?"
 },
 {
  "ROLE": "user",
  "MESSAGE": "Guide me through the process"
 },
 {
  "ROLE": "assistant",
  "MESSAGE": "I'm very happy to do that! Let's start with plant 1. For the segment, I suggest that we define the following conditions: - 'Plant' 'EQ' (equals) '1' - 'Sold-To-Party' 'EQ' (equals) 'C1' - 'Material Number' 'EQ' (equals) 'M1' - 'Sales and Distribution Document Number' 'BET' (is between) '4' '11' - 'Sales and Distribution Document Number' 'BET' (is between) '13' '20' This helps us to filter for all sales orders from plant 1, customer C1, material number M1 and the Sales and Distribution Document Number 4 to 20 (except 12). My suggested name for the segment would be PLANT_1_SEG. Shall we continue with that?"
 },
 {
  "ROLE": "user",
  "MESSAGE": "exactly"
 },
 {
  "ROLE": "function",
  "MESSAGE": "The segment PLANT_1_SEG was successfully created"
 },
 {
  "ROLE": "assistant",
  "MESSAGE": "Great! The PLANT_1_SEG segment has been successfully created. Now let's deal with the segment for plant 2. I suggest that we define the following conditions for the segment:- 'Plant' 'EQ' (equals) '2' - 'Sold-To-Party' 'EQ' (equals) 'C1' - 'Material Number' 'EQ' (equals) 'M1' - 'Sales and Distribution Document Number' 'BET' (is between) '4' '11' - 'Sales and Distribution Document Number' 'BET' (is between) '13' '20' - Storage Location 'EQ' (equals) 'ABC' This helps us to filter for all sales orders from plant 2, customer C1, material number M1, sales and distribution document number 4 to 20 (except 12) and the storage location ABC. My suggested name for the segment would be PLANT_2_SEG. Would we like to create it like this?"
 },
 {
  "ROLE": "user",
  "MESSAGE": "Okay"
 },
```

1400

FIG. 14A

```
{
  "ROLE": "function",
  "MESSAGE": "The segment PLANT_2_SEG was successfully created"
 },
 {
  "ROLE": "assistant",
  "MESSAGE": "Top! The PLANT_2_SEG segment has also been successfully created. Now let's deal with the segment for plant 3. I suggest that we define the following conditions for the segment: - 'Plant' 'EQ' (equals) '3' - 'Sold-To-Party' 'EQ' (equals) 'C1' - 'Material Number' 'EQ' (equals) 'M1' - 'Sales and Distribution Document Number' 'BET' (is between) '4' '11' - 'Sales and Distribution Document Number' 'BET' (is between) '13' '20' This helps us to filter for all sales orders from plant 3, customer C1, material number M1 and the sales and distribution document numbers 4 to 20 (except 12). My suggested name for the segment would be PLANT_3_SEG. Is that okay?"
 },
 {
  "ROLE": "user",
  "MESSAGE": "Yes"
 },
 {
  "ROLE": "function",
  "MESSAGE": "The segment PLANT_3_SEG was successfully created"
 },
 {
  "ROLE": "assistant",
  "MESSAGE": "Great! The PLANT_3_SEG segment has been successfully created. Now let's deal with the segment for plant 4. I suggest that we define the following conditions for the segment: - 'Plant' 'EQ' (equals) '4' - 'Sold-To-Party' 'EQ' (equals) 'C1' - 'Material Number' 'EQ' (equals) 'M1' - 'Sales and Distribution Document Number' 'BET' (is between) '4' '11' - 'Sales and Distribution Document Number' 'BET' (is between) '13' '20' - Storage Location 'EQ' (equals) 'DEF' This helps us to filter for all sales orders from plant 3, customer C1, material number M1, sales and distribution document number 4 to 20 (except 12) and the storage location DEF. My suggested name for the segment would be PLANT_4_SEG. Does that fit?"
 },
 {
  "ROLE": "user",
  "MESSAGE": "exactly"
 },
```

FIG. 14B

1400

```
  {
   "ROLE": "function",
   "MESSAGE": "The segment PLANT_4_SEG was successfully created"
  },
  {
   "ROLE": "assistant",
   "MESSAGE": "Excellent! The PLANT_4_SEG segment has also been successfully created. Now we will create a variant and assign the segments to specific confirmation strategies. My suggestion would be that we use the Win strategy for the PLANT_1_SEG and PLANT_2_SEG segments, Redistribute for the PLANT_3_SEG segment and Lots for the PLANT_4_SEG segment. In this way, the requirement quantities of plant 4 are completely released during backorder processing and plant 3 is made available to completely cover the requirements of plant 1 and plant 2. We can call this variant C1_M1_4_TO_20_VAR. Does this meet your expectations?"
  },
  {
   "ROLE": "user",
   "MESSAGE": "Yes"
  },
  {
   "ROLE": "function",
   "MESSAGE": "The variant C1_M1_4_TO_20_VAR was successfully created"
  },
  {
   "ROLE": "assistant",
   "MESSAGE": "Great! The variant C1_M1_4_TO_20_VAR has been successfully created. Now we can simulate a BOP run with this variant to see possible changes to the confirmations of plant 1, 2, 3 and 4. Should we continue with the simulation?"
  },
  {
   "ROLE": "user",
   "MESSAGE": "Lets go"
  },
  {
   "ROLE": "function",
   "MESSAGE": "The variant C1_M1_4_TO_20_VAR was successfully simulated"
  },
  {
   "ROLE": "assistant",
   "MESSAGE": "Excellent! The simulation of C1_M1_4_TO_20_VAR has been successfully executed. Take the time to inspect the results and see how the confirmations of plant 1, 2, 3 and 4 are affected. If you have any further questions or need any other help please do not hesitate to contact me. Happy analyzing!"
  }
]
```

FIG. 14C

1400

I would like to renew the confirmations of various sales orders. All sales orders with plant 1 or 2 should be fully confirmed. The sales orders with plant 3 can be improved if possible and plant 4 should lose all confirmations. Please note that this only applies to customer C1, material number M1 and document numbers 4 to 20 (except 12). Only the storage location ABC applies to plant 2 and DEF to plant 4.

A BOP run is just the right thing to check the feedback from customer orders. To do this, we need to create a segment for each plant. Should I guide you through the process step by step or should I try to set up the BOP run using your information in a fast-track procedure?

Guide me through the process

I'm very happy to do that! Let's start with plant 1. For the segment, I suggest that we define the following conditions:
- 'Plant' 'EQ' (equals) '1'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'

This helps us to filter for all sales orders from plant 1, customer C1, material number M1 and the Sales and Distribution Document Number 4 to 20 (except 12). My suggested name for the segment would be PLANT_1_SEG. Shall we continue with that?

Exactly

The segment PLANT_1_SEG was successfully created

Great! The PLANT_1_SEG segment has been successfully created. Now let's deal with the segment for plant 2. I suggest that we define the following conditions for the segment:
- 'Plant' 'EQ' (equals) '2'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'
- Storage Location 'EQ' (equals) 'ABC'

This helps us to filter for all sales orders from plant 2, customer C1, material number M1, sales and distribution document number 4 to 20 (except 12) and the storage location ABC. My suggested name for the segment would be PLANT_2_SEG. Would we like to create it like this?

Okay

1500

FIG. 15A

The segment PLANT_2_SEG was successfully created

Top! The PLANT_2_SEG segment has also been successfully created. Now let's deal with the segment for plant 3. I suggest that we define the following conditions for the segment:
- 'Plant' 'EQ' (equals) '3'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'

This helps us to filter for all sales orders from plant 3, customer C1, material number M1 and the sales and distribution document numbers 4 to 20 (except 12). My suggested name for the segment would be PLANT_3_SEG. Is that okay?

Yes

The segment PLANT_3_SEG was successfully created

Great! The PLANT_3_SEG segment has been successfully created. Now let's deal with the segment for plant 4. I suggest that we define the following conditions for the segment:
- 'Plant' 'EQ' (equals) '4'
- 'Sold-To-Party' 'EQ' (equals) 'C1'
- 'Material Number' 'EQ' (equals) 'M1'
- 'Sales and Distribution Document Number' 'BET' (is between) '4' '11'
- 'Sales and Distribution Document Number' 'BET' (is between) '13' '20'
- Storage Location 'EQ' (equals) 'DEF'

This helps us to filter for all sales orders from plant 3, customer C1, material number M1, sales and distribution document number 4 to 20 (except 12) and the storage location DEF. My suggested name for the segment would be PLANT_4_SEG. Does that fit?

Exactly

The segment PLANT_4_SEG was successfully created

Excellent! The PLANT_4_SEG segment has also been successfully created. Now we will create a variant and assign the segments to specific confirmation strategies. My suggestion would be that we use the Win strategy for the PLANT_1_SEG and PLANT_2_SEG segments, Redistribute for the PLANT_3_SEG segment and Lots for the PLANT_4_SEG segment. In this way, the requirement quantities of plant 4 are completely released during backorder processing and plant 3 is made available to completely cover the requirements of plant 1 and plant 2. We can call this variant C1_M1_4_TO_20_VAR. Does this meet your expectations?

Yes

FIG. 15B

1500

ARTIFICIAL INTELLIGENCE-SUPPORTED SETUP AND EXECUTION OF BACKORDER PROCESSING

BACKGROUND

Available-to-Promise (ATP) is a software feature implemented in some enterprise resource planning (ERP) systems. It responds to customer order inquiries based on the availability of resources, thereby supporting order promising and fulfillment through effective demand management and alignment with production plans. One of the advanced features of ATP is Backorder Processing (BOP). BOP is a process that involves the bulk handling of orders in a batch mode, where order confirmations (e.g., promised delivery date and quantity, resulting from an availability check—a function that calculates a possible confirmation for a requirement—being executed for a requirement) are adjusted to reflect business priorities and changes in the demand/supply dynamics of the order fulfillment process. This feature allows for the re-prioritization and resolution of demand and supply situations. However, the implementation and execution of BOP in existing ERP systems can pose challenges. Users often find themselves navigating through multiple applications and manually translating their intentions into selection criteria and confirmation strategies. This process can be time-consuming and necessitates a deep understanding of the various technical aspects of BOP. As a result, the BOP is often under-utilized and/or setup incorrectly, leading to inefficiencies in the order fulfillment process. Therefore, there is room for improvement in making the BOP process more user-friendly and efficient.

BRIEF DESCRIPTION OF THE DRAWINGS

FIG. 5 depicts an example system prompt for a large language model supporting AI-powered BOP.

FIG. 6 depicts an example prototype definition of a function for creating a BOP segment.

FIG. 7 depicts an example prototype definition of a function for creating a BOP variant.

FIG. 8 depicts an example prototype definition of a function for simulating execution of a BOP variant.

FIG. 9 depicts an example list of attributes as part of a context prompt provided to a large language model supporting AI-powered BOP.

FIG. 10 depicts an example list of operators as part of a context prompt provided to a large language model supporting AI-powered BOP.

FIG. 11 depicts an example list of confirmation schemes as part of a context prompt provided to a large language model supporting AI-powered BOP.

FIGS. 12A-12B depict an example structured object, which constitutes part of a context prompt provided to a large language model supporting AI-powered BOP.

FIGS. 13A-13C depict an example chat session represented by the example structured object of FIGS. 12A-12B.

FIGS. 14A-14C depict another example structured object, which constitutes part of a context prompt provided to a large language model supporting AI-powered BOP.

FIGS. 15A-15C depict an example chat session represented by the example structured object of FIGS. 14A-14C.

DETAILED DESCRIPTION

Overview of ATP and BOP

Figure 1:
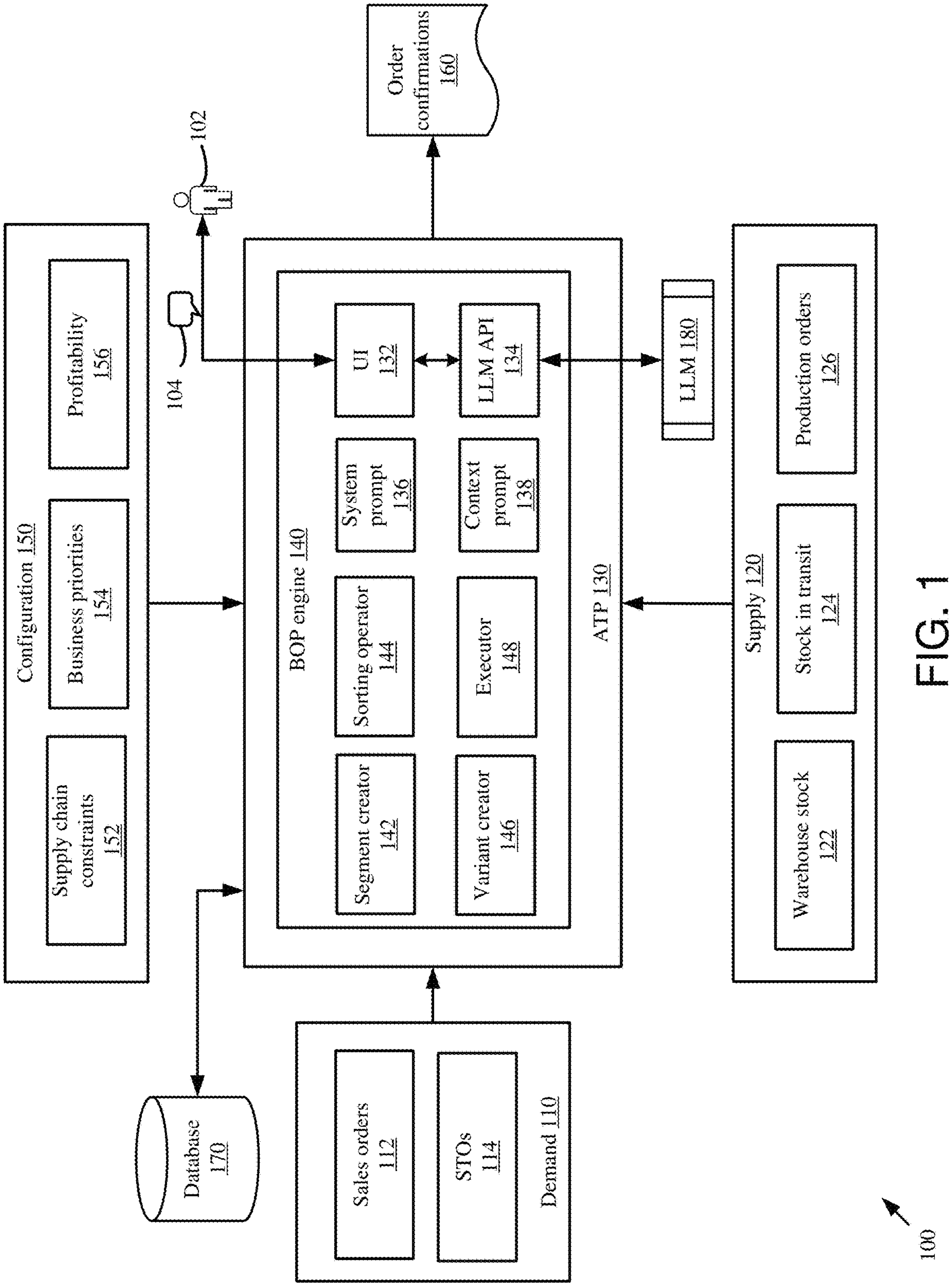
FIG. 1 is an overall block diagram of an example ERP system including a BOP engine powered by artificial intelligence (AI).

ATP is a software feature implemented in various supply chain management, manufacturing, and fulfillment systems. It is designed to respond to customer order inquiries based on resource availability, promising specific delivery terms such as available quantities and delivery due dates of a requested product. ATP supports order promising and fulfillment, manages demand, and aligns it with production plans. Enabled by information technology, ATP functions are typically integrated into ERP software packages. In some scenarios, ATP can anticipate future demand for specific products, computing quantities and availability dates. In some circumstances, ATP can dynamically allocate resources in response to actual customer orders.

One of the advanced features of ATP is BOP. BOP involves the bulk handling of orders in a batch mode, where order confirmations are adjusted to reflect business priorities and changes in the demand/supply dynamics of the order fulfillment process. This feature allows for the re-prioritization and resolution of demand and supply situations. For instance, in advanced ATP (aATP) in S/4HANA (provided by SAP SE, Walldorf, Germany), BOP is used to check material availability when the demand or supply situation in the order fulfillment process has changed, and it is necessary to check if previously calculated confirmations for requirements in business documents are still realistic. A sales order might be canceled, freeing up stock quantities, or an important customer might increase the requested quantity for a material, thereby wanting to consume stock currently confirmed for other sales orders. Not reacting to the changed availability situation can result in confirmed quantities exceeding available quantities, leading to availability checks for over-confirmed materials failing, leaving the system unable to release materials for delivery creation.

However, the implementation and execution of BOP in existing ERP systems can pose challenges. Users often find themselves navigating through multiple applications (e.g., configure BOP segments, create BOP variants, schedule BOP run, etc.), each allowing to configure a specific step prior to running BOP. Each application requires users to manually translate their intentions into selection criteria and confirmation strategies. This process can be time-consuming and necessitates a deep understanding of the various technical aspects of BOP, including understanding the purpose of different confirmation strategies, how to assign segments to these strategies, etc. As a result, BOP is often underutilized and/or set up incorrectly, leading to inefficiencies in the order fulfillment process.

The technologies described herein overcome many of the challenges described above by leveraging the power of artificial intelligence (AI). This AI-powered solution simplifies the complex process of BOP in ERP systems. It automates the setup and execution of BOP, thereby eliminating the need for users to navigate through multiple applications and manually configure each step. This high-level automation not only saves time but also reduces the chances of errors, leading to a more efficient and effective order fulfillment process.

Example ERP System with AI-Powered BOP

FIG. 1 shows an overall block diagram of an example ERP system 100 integrated with AI-powered BOP.

The ERP system 100 includes an ATP module 130, which receives input from three primary blocks: demand 110, supply 120, and configuration 150. The demand 110 includes requirements (which can also be referred to as "order requirements") for products or services, such as sales orders 112 and stock transfer orders (STOs) 114. As described herein, a requirement refers to a requested quantity of a certain material on a certain date (e.g., a line item in a sales order). Sales orders 112 can be generated by customer requests for specific products, while STOs 114 can be generated by internal requests, e.g., to relocate inventory from one location to another. The supply 120 represents the resources available to meet the demand 110. For example, the supply 120 can include warehouse stock 122 (e.g., the inventory currently available in warehouses), stock in transit 124 (e.g., inventory being relocated), production orders 126 (e.g., requests to manufacture more inventory), etc. The configuration 150 includes parameters that guide the operation of the ATP module 130. Example configuration parameters include supply chain constraints (such as limits on the amount of inventory that can be moved at once, etc.), business priorities (such as which orders should be fulfilled first, etc.), profitability considerations (such as the cost of producing or moving inventory, etc.), among others.

The ATP module 130 is configured to balance the demand 110 with the supply 120 while considering various parameters in the configuration 150. The ATP module 130 processes these inputs to generate order confirmations 160, which are commitments to fulfill specific orders in the demand 110. In addition to processing inputs and generating order confirmations, the ATP module 130 interfaces with a database module 170, which manages the storage and retrieval of data relevant to the ATP module's operation. Such data can include historical and real-time information about demand, supply, and configurations, as well as the status of order confirmations. By accessing this data, the ATP module 130 can make informed decisions about how to balance demand and supply, prioritize orders, and manage inventory, thereby optimizing the order fulfillment process.

As shown in FIG. 1, the ATP module 130 includes a BOP engine 140 configured to manage backorders, which are orders that cannot be fulfilled immediately due to insufficient supply (other functional components of the ATP module 130 are omitted in FIG. 1 for simplicity). The BOP engine 140 employs sophisticated algorithms to prioritize backorders based on various factors such as order importance, customer value, and delivery deadlines. This allows the ATP module 130 to make informed decisions about which orders to fulfill first when supply is limited.

The BOP engine 140 can include several functional units, each of which can have a specific role in the BOP workflow. For example, the BOP engine 140 can include a segment creator 142, a sorting operator 144, a variant creator 146, and an executor 148. Each of these functional units can exist as a separate application, complete with its own unique application programming interface (API).

The segment creator 142 can be invoked to generate BOP segments, which include groups of similar backorders. As described herein, a BOP segment can include a saved selection of settings or filters that determines which requirements are selected and the sequence in which the requirements are prioritized. This grouping allows the BOP engine 140 to handle similar orders together, thereby improving efficiency.

The sorting operator 144 can be employed to organize backorders within each BOP segment based on certain criteria, such as order importance or delivery deadline (e.g., to ensure that the most critical orders are handled first). In some cases, the sorting operation can be optional in the BOP workflow.

The variant creator 146 can be called to create a BOP variant, which is a saved selection of settings that determines which requirements are included in a BOP run and how they are checked. The BOP variant represents a strategic plan for fulfilling the backorders within each BOP segment. This plan not only takes into account the available supply and the configuration parameters of the ATP module 130, but also assigns a confirmation strategy (which can also be referred to as "confirmation scheme") for each BOP segment. As described further below, a confirmation strategy defines how a requirement (or all requirements in a BOP segment) is handled in a BOP run.

The executor 148 is configured to execute the plan or the BOP variant—also referred to as a "BOP run"—either immediately or at a scheduled time. As described herein, the BOP run refers to an executed instance of the background functionality that checks the availability of multiple requirements at the same time, in a defined sequence and taking any filters into consideration, as defined in the BOP variant. A BOP run can be simulated or scheduled for immediate execution, or it can be scheduled as a one-time or regular background job (e.g., at mid-night of each day, at noon of each Sunday, etc.) in a batch mode.

Although not shown, the BOP engine 140 can include some additional functional units, such as a monitor configured to display results of BOP runs and/or confirmation details, etc. Together, these functional units enable the BOP engine 140 to effectively manage backorders, optimizing the order fulfillment process of the ATP module 130.

The BOP engine 140 can leverage AI to facilitate automatic setup and execution of BOP runs. As shown in FIG. 1, the BOP engine 140 can further include a user interface (UI) 132 and a large language model (LLM) API 134. The UI 132 can provide a chat interface, through which a user 102 can enter one or more user prompts 104 in natural language. These user prompts 104 can be instructions or queries related to the setup and execution of BOP runs. The user prompts 104 can be sent to an LLM 180 through the LLM API 134, which provides access to the LLM 180. As described further below, the LLM 180 is an AI model that interprets the user's natural language prompts and translates them into actionable commands for the BOP engine 140. The LLM 180 can be part of the ERP system 100 (e.g., hosted locally within an organization's ERP system), or external to the ERP system 100 (e.g., hosted by a third-party platform). In addition to the user prompts 104, the BOP engine 140 can further generate a system prompt 136 which instructs the LLM 180 on how to setup and execute BOP runs. Furthermore, a context prompt 138 can be generated that includes various contextual information about the BOP workflow. Further information on the system prompt 136 and the context prompt 138 is described more fully below.

The integration of user prompts 104, system prompt 136, and context prompt 138 enables the LLM 180 to formulate a comprehensive plan for the setup and execution of BOP runs. This interactive and intelligent setup and execution of BOP runs greatly enhance the efficiency and effectiveness of the BOP engine 140. Moreover, such AI-powered BOP engine 140 eliminates the need for specialized expertise from the user 102, as the LLM 180 can intelligently interpret natural language user prompts 104 and translates them into actionable commands.

In practice, the systems shown herein, such as the ERP system 100, can vary in complexity, with additional functionality, more complex components, and the like. For example, there can be additional functionality within the BOP engine 140. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, attributes, prompts, values, and the like can be stored in one or more computer-readable storage media or computer-readable storage devices. The technologies described herein can be generic to the specifics of operating systems or hardware and can be applied in any variety of environments to take advantage of the described features.

Example Overall Method for Implementing AI-Powered BOP

Figure 2:
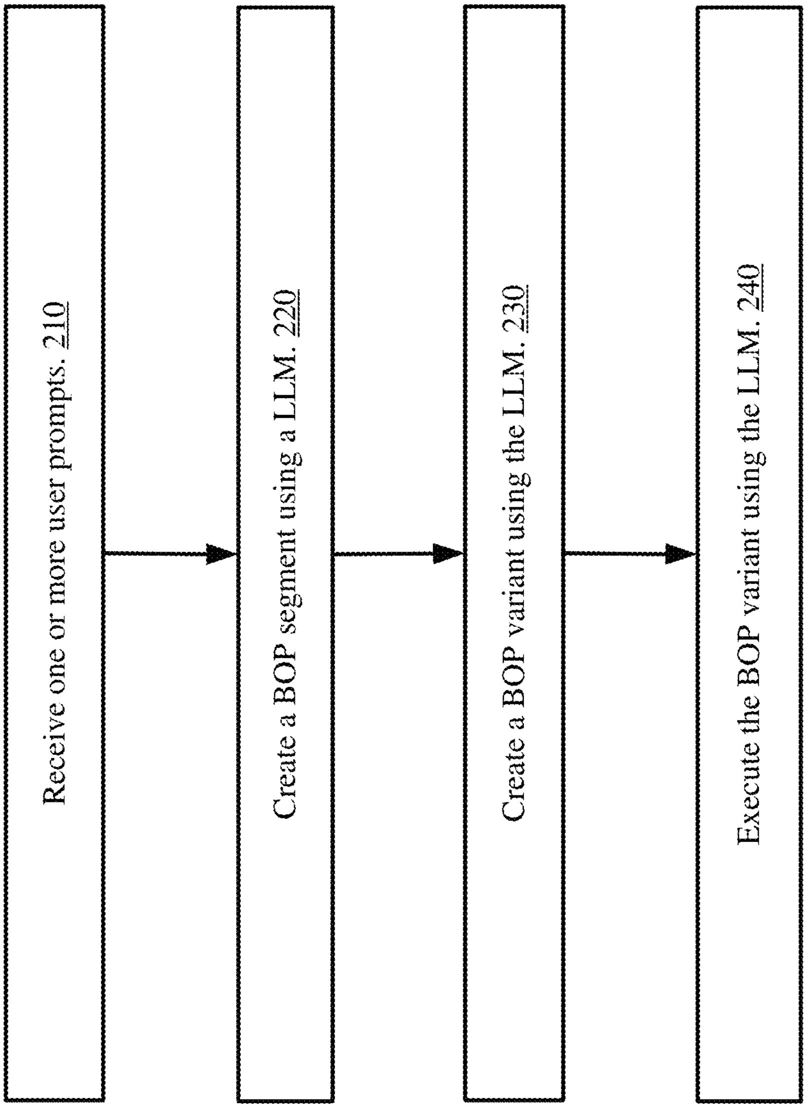
FIG. 2 is a flowchart illustrating an example overall method for implementing AI-powered BOP in an ERP system.

FIG. 2 is a flowchart illustrating an example overall method 200 for implementing AI-powered BOP. The method 200 can be performed, e.g., by the ERP system 100 of FIG. 1.

At step 210, the method can receive one or more user prompts (e.g., user prompts 104) from a user interface (e.g., the UI 102). The user prompts can be written in natural language. As described herein, a natural language user prompt is a user-generated text-based input that employs human language to request information or actions from a software or system.

In some examples, one user prompt (or few user prompts) can contain sufficient information to define a BOP run, which can be automatically setup and executed in the backend of the system (also referred to as a "fast-track approach"). In other examples, an interactive process (also referred to as a "guided approach") may be necessary, where multiple user prompts are required to gather all the necessary information to set up and execute a BOP run. This guided approach involves a back-and-forth dialogue between the user and the system. The user provides information or makes requests through the user interface, and the system responds with requests for additional information or clarification as needed. This iterative process continues until all the necessary information has been collected so that the BOP run can be set up and executed accordingly. This guided approach allows for a more tailored and precise setup of BOP runs, accommodating complex scenarios that may not be fully captured in a single user prompt. It also provides users with the opportunity to refine their requirements throughout the setup process, enhancing the flexibility and adaptability of the system.

The received user prompts can be sent to a LLM (e.g., the LLM 180), which can generate corresponding responses. In some examples, the LLM receives not only the user prompts, but also a system prompt (e.g., the system prompt 136) and a context prompt (e.g., the context prompt 138). The system prompt can be configured to instruct the LLM on how to setup and execute BOP runs, including making a sequence of function or API calls in the backend. The context prompt can be configured to provide contextual information about the BOP, including prototype definitions of various functions or APIs that are required to setup and execute BOP runs.

At step 220, the method can create, in runtime, a BOP segment using the LLM. For example, based on the user prompts, system prompt, and context prompt, the LLM can invoke a function or API call to create the BOP segment (e.g., by the segment creator 142) in the backend. The BOP segment selects a subset of a plurality of requirements (e.g., backorders that need to be fulfilled) using one or more filters determined based on the one or more user prompts. As described herein, each filter can be defined by an attribute, an operator, and one or more attribute values. In some examples, multiple BOP segments can be generated by the LLM, each having its own set of filters. Thus, each BOP segment can include a group of requirements or backorders which satisfy conditions specified by the filters of the corresponding BOP segment.

At step 230, the method can create, in runtime, a BOP variant using the LLM. For example, based on the user prompts, system prompt, and context prompt, the LLM can invoke a function or API call to create the BOP variant (e.g., by the variant creator 146) in the backend. The BOP variant can define a confirmation strategy for the BOP segment based on the one or more user prompts. The confirmation strategy defined for the BOP segment applies to all requirements included in the BOP segment. In other words, all backorders within the BOP segment will be processed using the same confirmation strategy during execution of the BOP variant. If there are multiple BOP segments, the BOP variant can assign a corresponding confirmation strategy for each BOP segment. In some examples, the confirmation strategy assigned to each BOP segment can be selected from a predefined list of enumerated confirmation strategies, which can be included in the context prompt. Example confirmation strategies are described more fully below.

At step 240, the method can execute the BOP variant using the LLM. This execution can be scheduled or performed immediately, and it can be an actual BOP run or a simulated BOP run for analysis purposes. For example, based on the user prompts, system prompt, and context prompt, the LLM can invoke a function or API call to execute (or schedule to execute, or simulate executing) the BOP variant (e.g., by the executor 146) in the backend. The execution involves batch processing the subset of the plurality of requirements (included in the BOP segment) using the confirmation strategy (assigned to the BOP segment). If the BOP variant has multiple BOP segments, the execution will batch process requirements included in each BOP segment using the specific confirmation strategy assigned to the BOP segment.

Although not shown in FIG. 2, the method 200 can include additional steps. For example, in some cases, based on the user prompts, system prompt, and context prompt, the LLM can invoke a function or API call to sort requirements in any BOP segment (e.g., by the sorting operator 146) based on specific sorting criteria.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Confirmation Strategies

As described above, the BOP variant can assign a confirmation strategy (selected from a list of predefined confirmation strategies) for each created BOP segment. Example confirmation strategies include "Win," "Gain," "Improve," "Redistribute," "Fill," and "Lose," as implemented in BOP of aATP in SAP S/4HANA.

For a BOP segment assigned with a "Win" confirmation strategy, each requirement in the BOP segment shall be fully confirmed on the requested date (or immediately, if the requested material available date is in the past). For the "Win" confirmation strategy, if requirements cannot be fully confirmed on time, an exception is raised. Depending on the configuration options for exception handling, the BOP run stops completely or only for the affected material-plant combinations.

For a BOP segment assigned with a "Gain" confirmation strategy, all requirements in the BOP segment shall retain, at least their confirmation or, if possible, improve. For the "Gain" confirmation strategy, if current confirmations cannot be retained, an exception is raised. Depending on the configuration options for exception handling, the BOP run stops completely or only for the affected material-plant combinations.

For a BOP segment assigned with an "Improve" confirmation strategy, each requirement in the BOP segment will try to retain, at least its confirmation and if possible, improve. But it is also possible that some of the requirements may lose their confirmation. For the "Improve" confirmation strategy, if current confirmations cannot be retained, no exceptions are raised. Instead, the BOP would worsen the confirmation based on the available quantity.

For a BOP segment assigned with a "Redistribute" confirmation strategy, each requirement in the BOP segment can get a better, equal, or worse confirmation. For the "Redistribute" confirmation strategy, BOP can release quantities of requirements so that they can be used to fulfill other requirements with higher priorities. BOP can also produce a worse confirmation when requirements with a higher priority have reduced the available quantity.

For a BOP segment assigned with a "Fill" confirmation strategy, each requirement in the BOP segment does not gain additional quantity or get an earlier confirmation date; instead, it can get an equal, or worse confirmation. To confirm requirements from "Win" and "Gain" confirmation strategies, BOP releases quantities of requirements assigned to the "Fill" confirmation strategy. This can result in a later confirmation or a loss in confirmed quantity.

For a BOP segment assigned with a "Lose" confirmation strategy, all requirements in the BOP segment will lose their current confirmation and are not confirmed. The released quantity of the "Lose" requirements can be used to confirm more important requirements or left as quantity available to confirm future requirements.

Example Overview of LLMs

Generative AI is a type of AI that can create content, such as text, images, or even code, and it is used in enterprise environments for tasks like automated content generation, data analysis, and chatbot interactions to enhance productivity and efficiency. In contrast to discriminative AI models which aim to make decisions or predictions based on features of the input data, generative AI models focus on generating new data points. The LLM is a type of generative AI that can understand and generate human-like text. In generative AI, such as LLMs, a prompt serves as an input or instruction that informs the AI of the desired content, context, or task, allowing users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pretrained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to an LLM to generate responses. Prompts in LLM can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 3:
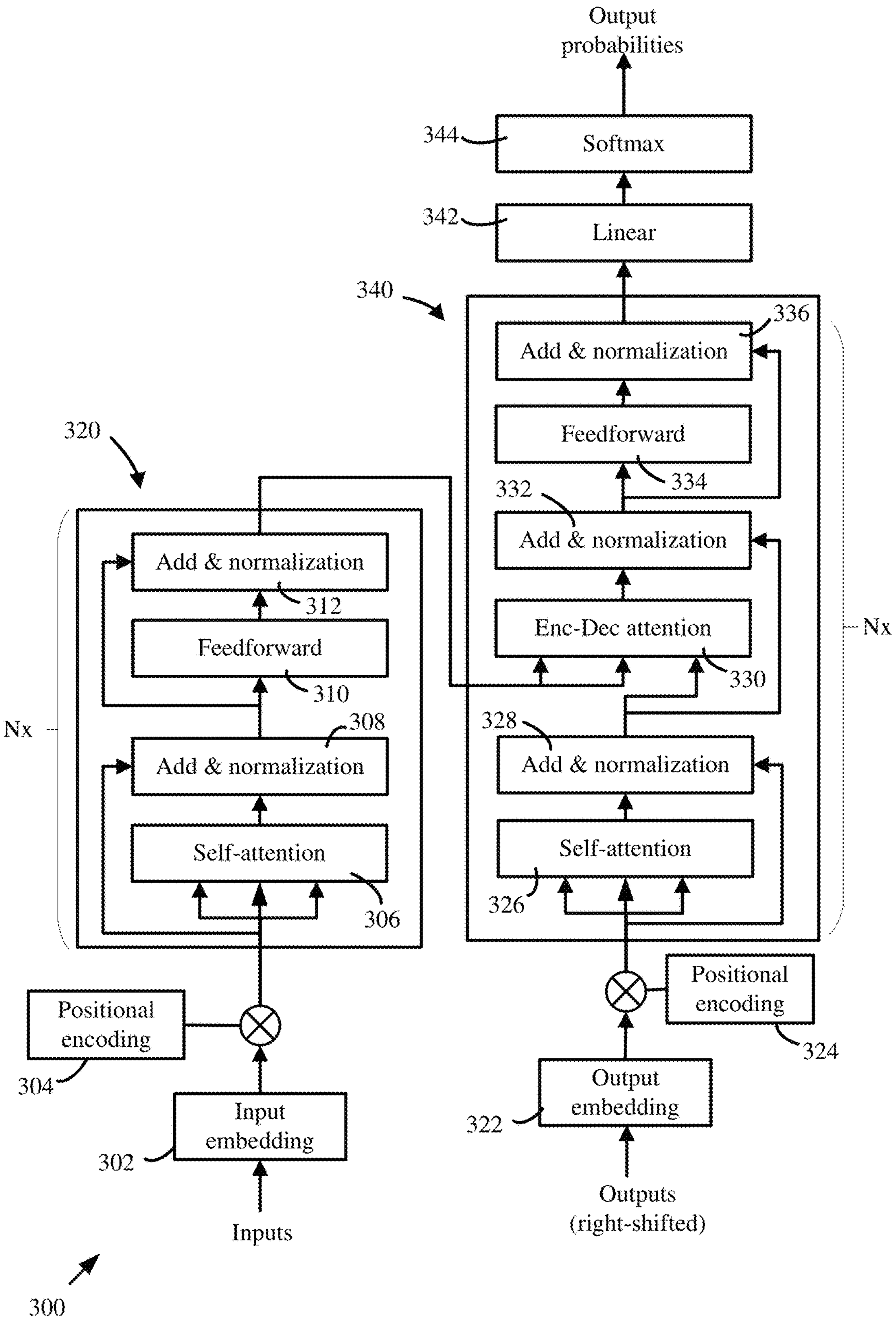
FIG. 3 is an architecture diagram of an example large language model.

FIG. 3 shows an example architecture of an LLM 300, which can be used as the LLM 180 of FIG. 1.

In the depicted example, the LLM 300 uses an autoregressive model (as implemented in OpenAI's GPT) to generate text content by predicting the next word in a sequence given the previous words. The LLM 300 can be trained to maximize the likelihood of each word in the training dataset, given its context.

As shown in FIG. 3, the LLM 300 can have an encoder 320 and a decoder 340, the combination of which can be referred to as a "transformer." The encoder 320 processes input text, transforming it into a context-rich representation. The decoder 340 takes this representation and generates text output.

For autoregressive text generation, the LLM 300 generates text in order, and for each word it generates, it relies on the preceding words for context. During training, the target or output sequence, which the model is learning to generate, is presented to the decoder 340. However, the output is right shifted by one position compared to what the decoder 340 has generated so far. In other words, the model sees the context of the previous words and is tasked with predicting the next word. As a result, the LLM 300 can learn to generate text in a left-to-right manner, which is how language is typically constructed.

Text inputs to the encoder 320 can be preprocessed through an input embedding unit 302. Specifically, the input embedding unit 302 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 300, the targets or output sequences presented to the decoder 340 can be preprocessed through an output embedding unit 322. Like the input embedding unit 302, the output embedding unit 322 can provide a continuous representation, or output embedding, for each token in the output sequences.

Generally, the vocabulary in LLM 300 is fixed and is derived from the training data. The vocabulary in LLM 300 consists of tokens generated above during the training process. Words not in the vocabulary cannot be output. These tokens are strung together to form sentences in the text output.

In some examples, positional encodings (e.g., 304 and 324) can be performed to provide sequential order information of tokens generated by the input embedding unit 302 and output embedding unit 322, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 320 and decoder 340 can include multiple stacked or repeated layers (denoted by Nx in FIG. 3). The number of stacked layers in the encoder 320 and/or decoder 340 can vary depending on the specific LLM architecture. Generally, a higher "N" typically means a deeper model, which can capture more complex patterns and dependencies in the data but may require more computational resources for training and inference. In some examples, the number of stacked layers in the encoder 320 can be the same as the number of stacked layers in the decoder 340. In other examples, the LLM 300 can be configured so that the encoder 320 and decoder 340 can have different numbers of layers. For example, a deeper encoder (more layers) can be used to better capture the input text's complexities while a shallower decoder (fewer layers) can be used if the output generation task is less complex).

The encoder 320 and the decoder 340 are related through shared embeddings and attention mechanisms, which allow the decoder 340 to access the contextual information generated by the encoder 320, enabling the LLM 300 to generate coherent and contextually accurate responses. In other words, the output of the encoder 320 can serve as a foundation upon which the decoder network can build the generated text.

Both the encoder 320 and decoder 340 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 3, the encoder 320 includes an intra-attention or self-attention neural network 306 and a feedforward neural network 310, and the decoder 340 includes a self-attention neural network 326 and a feedforward neural network 334. The self-attention neural networks 306, 326 allow the LLM 300 to weigh the importance of different words or tokens within the same input sequence (self-attention in the encoder 320) and between the input and output sequences (self-attention in the decoder 340), respectively.

In addition, the decoder 340 also includes an inter-attention or encoder-decoder attention neural network 330, which receives input from the output of the encoder 320. The encoder-decoder attention neural network 330 allows the decoder 340 to focus on relevant parts of the input sequence (output of the encoder 320) while generating the output sequence. As described below, the output of the encoder 320 is a continuous representation or embedding of the input sequence. By feeding the output of the encoder 320 to the encoder-decoder attention neural network 330, the contextual information and relationships captured in the input sequence (by the encoder 320) can be carried to the decoder 340. Such connection enables the decoder 340 to access to the entire input sequence, rather than just the last hidden state. Because the decoder 340 can attend to all words in the input sequence, the input information can be aligned with the generation of output to improve contextual accuracy of the generated text output.

In some examples, one or more of the attention neural networks (e.g., 306, 326, 330) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 306, 326, 330) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 3, both the encoder 320 and the decoder 340 can include one or more addition and normalization layers (e.g., the layers 308 and 312 in the encoder 320, the layers 328, 332, and 336 in the decoder 340). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 342 at the output end of the decoder 340 can transform the output embeddings into the original input space. Specifically, the output embeddings produced by the decoder 340 are forwarded to the linear layer 342, which can transform the high-dimensional output embeddings into a space where each dimension corresponds to a word in the vocabulary of the LLM 300.

The output of the linear layer 342 can be fed to a softmax layer 344, which is configured to implement a softmax function, also known as softargmax or normalized exponential function, which is a generalization of the logistic function that compresses values into a given range. Specifically, the softmax layer 344 takes the output from the linear layer 342 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 3, the general operation process for the LLM 300 to generate a reply or text output in response to a received prompt input is described below.

First, the input text is tokenized, e.g., by the input embedding unit 302, into a sequence of tokens, each representing a word or part of a word. Each token is then mapped to a fixed-length vector or input embedding. Then, positional encoding 304 is added to the input embeddings to retain information regarding the order of words in the input text.

Next, the input embeddings are processed by the self-attention neural network 306 of the encoder 320 to generate a set of hidden states. As described above, multi-head attention mechanism can be used to focus on different parts of the input sequence. The output from the self-attention neural network 306 is added to its input (residual connection) and then normalized at the addition and normalization layer 308.

Then, the feedforward neural network 310 is applied to each token independently. The feedforward neural network 310 includes fully connected layers with non-linear activation functions, allowing the model to capture complex interactions between tokens. The output from the feedforward neural network 310 is added its input (residual connection) and then normalized at the addition and normalization layer 312.

The decoder 340 uses the hidden states from the encoder 320 and its own previous output sequence to generate the next token in an autoregressive manner so that the sequential output is generated by attending to the previously generated tokens. Specifically, the output of the encoder 320 (input embeddings processed by the encoder 320) are fed to the encoder-decoder attention neural network 330 of the decoder 340, which allows the decoder 340 to attend to all words in the input sequence. As described above, the encoder-decoder attention neural network 330 can implement a multi-head attention mechanism, e.g., computing a weighted sum of all the encoded input vectors, with the most relevant vectors being attributed the highest weights.

The previous output sequence of the decoder 340 is first tokenized by the output embedding unit 322 to generate an output embedding for each token in the output sequence. Similarly, positional embedding 324 is added to the output embedding to retain information regarding the order of words in the output sequence.

The output embeddings are processed by the self-attention neural network 326 of the decoder 340 to generate a set of hidden states. The self-attention mechanism allows each token in the text output to attend to all tokens in the input sequence as well as all previous tokens in the output sequence. The output from the self-attention neural network 326 is added to its input (residual connection) and then normalized at the addition and normalization layer 328.

The encoder-decoder attention neural network 330 receives the output embeddings processed through the self-attention neural network 326 and the addition and normalization layer 328. Additionally, the encoder-decoder attention neural network 330 also receives the output from the addition and normalization layer 312 which represents input embeddings processed by the encoder 320. By considering both processed input embeddings and output embeddings, the output of the encoder-decoder attention neural network 330 represents an output embedding which takes into account both the input sequence and the previously generated outputs. As a result, the decoder 340 can generate the output sequence that is contextually aligned with the input sequence.

The output from the encoder-decoder attention neural network 330 is added to part of its input (residual connection), i.e., the output from the addition and normalization layer 328, and then normalized at the addition and normalization layer 332. The normalized output from the addition and normalization layer 332 is then passed through the feedforward neural network 334. The output of the feedforward neural network 334 is then added to its input (residual connection) and then normalized at the addition and normalization layer 336.

The processed output embeddings output by the decoder 340 are passed through the linear layer 342, which maps the high-dimensional output embeddings back to the size of the vocabulary, that is, it transforms the output embeddings into a space where each dimension corresponds to a word in the vocabulary. The softmax layer 344 then converts output of the linear layer 342 into probabilities, each of which corresponds to the likelihood of a particular word being the next word in the sequence. Finally, the LLM 300 samples an output token from the probability distribution generated by the softmax layer 344 (e.g., selecting the token with the highest probability), and this token is added to the sequence of generated tokens for the text output.

The steps described above are repeated for each new token until an end-of-sequence token is generated or a maximum length is reached. Additionally, if the encoder 320 and/or decoder 340 have multiple stacked layers, the steps performed by the encoder 320 and decoder 340 are repeated across each layer in the encoder 320 and the decoder 340 for generation of each new token.

Example Overview of Input Prompts

Figure 4:
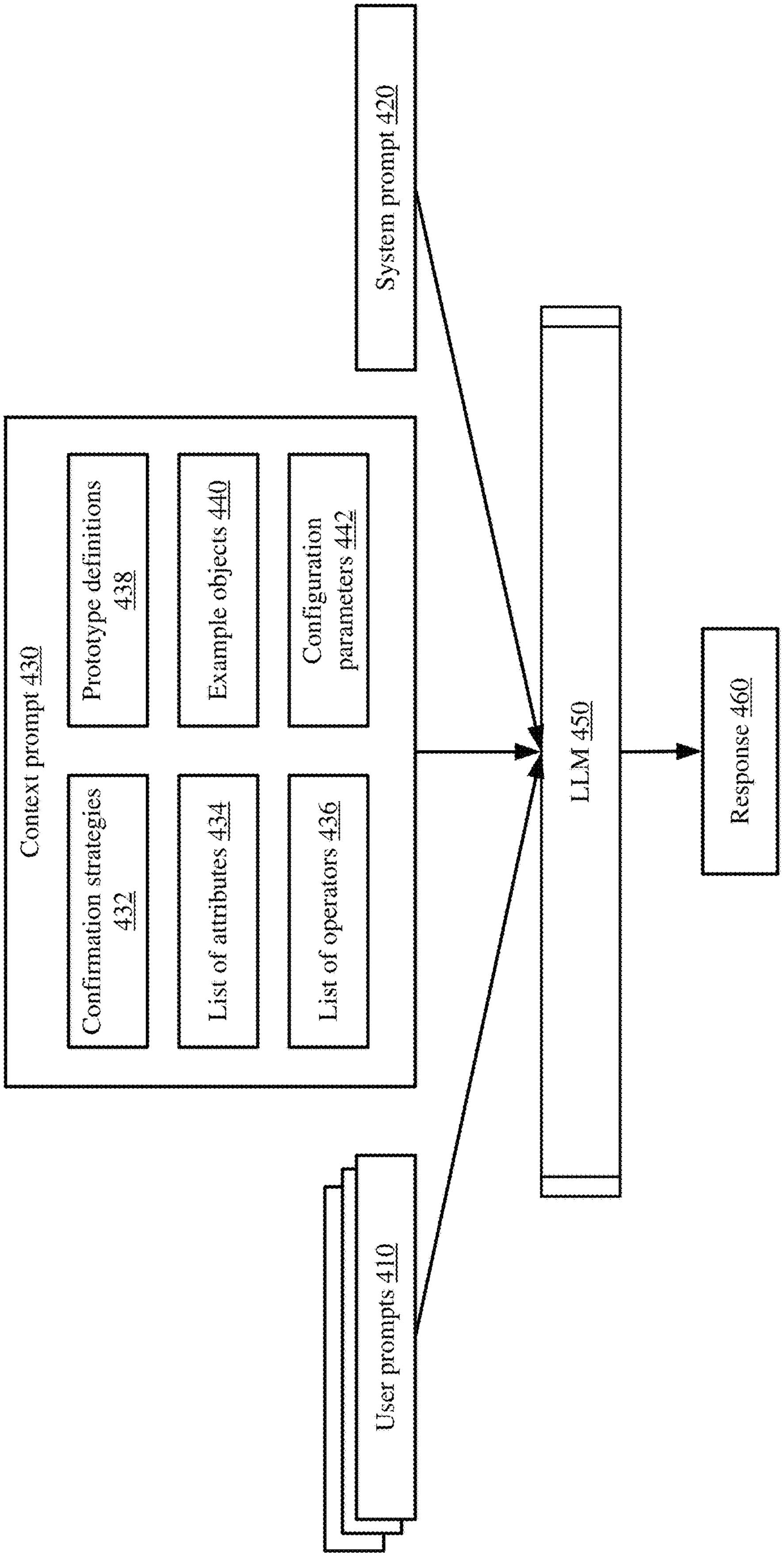
FIG. 4 is a block diagram depicting example input and output of a large language model supporting AI-powered BOP.

FIG. 4 is a block diagram depicting example input and output of a LLM 450 supporting AI-powered BOP. The LLM 450 can be the LLM 180 of FIG. 1 or LLM 300 of FIG. 3.

As shown in FIG. 4, the LLM 450 has three different types of input prompts: one or more user prompts 410 (similar to the user prompts 104 of FIG. 1), a system prompt 420 (similar to the system prompt 136 of FIG. 1), and a context prompt 430 (similar to the context prompt 138 of FIG. 1). Each user prompt 410, along with the system prompt 420 and context prompt 430, can be sent to the LLM 450 in runtime. In response, the LLM 450 can generate a corresponding response 460, which can implement certain BOP functions in the backend and/or request the user for additional information in order to continue the BOP workflow.

If the fast-track approach is taken for the BOP, one user prompt can be configured to contain sufficient information to define a BOP run. For example, the user prompt can specify values for all parameters that are necessary to create BOP segments, create a BOP variant, and execute the BOP variant. Alternatively, if any of the required information for a BOP run (e.g., names of the BOP segments, confirmation strategies for the BOP segments, etc.) is missing, predefined default values can be used.

On the other hand, if the guided approach is used, an initial user prompt can simply be a request for confirmation of some backorders. The LLM 450 can respond to such request by asking the user to provide missing information, e.g., through additional user prompt(s). This prompt-response between the user and the LLM 450 can be iterative until all the necessary information has been collected for setting up and executing the BOP run.

The system prompt 420 can be predefined through prompt engineering. In some examples, the system prompt 420 can contain specific instructions (including the logical sequence of multiple BOP functions) that guide the LLM 450 in its interactions with the user. An example system prompt is described further below with reference to FIG. 5.

The context prompt 430 includes various contextual information relevant to the BOP. For example, the context prompt 430 can include a list of confirmation strategies 432 (from which a specific confirmation strategy can be assigned to a BOP segment), a list of attributes 434 which can be possibly used to define filters in BOP segments, a list of operators 436 which can be paired with any of the attributes used to define those filters, and multiple prototype definitions 438 of BOP functions or APIs (e.g., functions for creating a BOP segment, creating a BOP variant, executing a BOP variant, etc.). In some examples, the context prompt 430 can also include example objects 440 which represent example chat sessions (e.g., examples of chat sessions using the fast-track approach and guided approach) between the user and the LLM 450. Additionally, the context prompt 430 can include configuration parameters 440 for the LLM 442 (e.g., LLM version, model temperature, maximum number of tokens, etc.). Further information about the context prompt is described below with examples shown in FIGS. 6-15.

Example System Prompt

FIG. 5 shows an example system prompt 500 which can be used as an input to an LLM for AI-powered BOP. The system prompt 500 is a structured set of instructions designed to guide the LLM in setting up and execute a BOP run. In the depicted example, the system prompt 500 is organized into several sections, each serving a specific purpose.

For example, a "Role" section of the system prompt 500 provides context about the user and the task at hand. It informs the LLM that its task is to assist a fulfillment manager. It specifies that the context of assistance is within SAP, particularly focusing on the Available-to-Promise (ATP) system and its Backorder Processing (BOP) component. Although BOP is an abbreviation used in various contexts, in this case, it clearly refers to ATP backorder processing in SAP. This section effectively establishes the context and the specific task of the LLM.

A "Task" section of the system prompt 500 outlines the primary objective (to setup a BOP run) and its associated subtasks (e.g., creating a segment, creating a variant, and simulating a variant) in a sequential manner. The task section also presents two procedural options: a guided approach and a fast-track method. The subtasks are enumerated in a logical order. This enumeration, which the LLM can process more effectively than sentence-based descriptions, also correlates with the function calls available to the LLM, as described further below.

An "Information about BOP" section of the system prompt 500 provides the LLM with concise and necessary details needed to create a BOP run. This section explains the dependencies and relationships between different components of a BOP run, such as segments, variants, and conditions. For instance, it explains that a BOP run always consists of one variant, which can contain multiple segments, but at least one. This illustrates a one-to-many cardinality relationship between the BOP variant and BOP segments. It also specifies that a BOP segment must include at least one criterion with at least one condition, and a condition must include an attribute, an operator, and at least one value. This information aids the LLM in ensuring the necessary conditions for a function call are met.

A "Language" section of the system prompt 500 sets the tone and formality of the conversation. It also limits the scope of the response and provides guidelines on how the LLM should react to instructions unrelated to BOP or ATP. The guidelines cover both the content and form of the answer to reduce the risk of hallucination by the LLM. It also instructs the LLM to add positive comments for a better user experience.

An "Additional" section of the system prompt 500 provides further instructions to improve the flow of the conversation. It includes guidelines on when to ask for clarifications, make suggestions, and how to handle multiple requests in a single user input. Specifically, it instructs the LLM to identify missing input values of the functions and request the user to provide the missing input values.

An "Output" section of the system prompt 500 emphasizes that the LLM's responses should be in natural language and text form only (e.g., it discourages the use of enumerations or JSON files in responses).

Thus, the system prompt 500 can serve as a comprehensive guide for the LLM to assist a user in setting up a BOP run in SAP's ATP system. It provides clear instructions, context, and guidelines to ensure an effective and user-friendly interaction. It should be understood that the system prompt 500 depicted in FIG. 5 is merely exemplary, and variations or modifications could be made without deviating from the core principles (e.g., additional subtasks can be specified to sort a BOP segment, etc.).

Example Prototype Definitions of BOP Functions in Context Prompt

As described above, a context prompt sent to the LLM can provide contextual information about the BOP, including how to invoke different BOP functions or APIs.

As an example, FIG. 6 shows a prototype definition 600 for a function named sc_function_calls-create_segment, which is used to create a new BOP segment in the BOP of SAP aATP. This function takes an object as a parameter with two properties: name and criteria. The name is a string that represents the name of the new BOP segment, accepting only uppercase letters. The criteria are an array of criteria, each containing an array of conditions (also referred to as "filters"). Each condition has an attribute, an operator, a valuefr, and a valueto. The attribute represents the attributes from the context table "Field Catalog for Condition Attributes". The operator can be either EQ (equals) or BET (between). The valuefr sets the value for a characteristic from the catalog, and if a value range is asked for then this is the start value. The valueto is normally empty, but if a value range is asked for then this is the end value. The prototype definition 600 is sent to the LLM as part of a context prompt, which then uses this information to create the BOP segment (e.g., by calling the function sc_function_calls-create_segment) as per the defined criteria and conditions.

As another example, FIG. 7 shows a prototype definition 700 for a function named sc_function_calls-create_variant, which is used create a new BOP variant by assigning existing BOP segments to confirmation strategies. It takes an object as a parameter with two properties: name and segments. The name is a string that represents the new BOP variant name, accepting only uppercase letters. The segments are an array containing combinations of BOP segment names and confirmation strategies. Each entry in this array includes a name representing an existing BOP segment, and a strategy indicating the assigned confirmation strategy enumerated as WIN, GAIN, REDISTRIBUTE, IMPROVE, or LOSE. This prototype definition 700 is sent to the LLM as part of a context prompt, which then uses this information to create the BOP variant (e.g., by calling the sc_function_calls-create_variant function) as per the defined segments and strategies.

As yet another example, FIG. 8 shows a prototype definition 800 for a function named sc_function_calls-simulate_variant, which is used to simulate a BOP run for a BOP variant (i.e., execute the BOP variant). It takes an object as a parameter with a single property: name. The name is a string that represents the name of the BOP variant. This prototype definition 800 is sent to the LLM as part of a context prompt, which then uses this information to simulate the BOP run (e.g., by calling the sc_function_calls-simulate_variant function) as per the defined BOP variant.

Example Attributes, Operators, and Confirmation Strategies in Context Prompt

As described above, the context prompt sent to the LLM can also include a list of attributes which can be used to define filters in BOP segments, a list of operators which can be paired with any of the attributes used to define those filters, and a list of confirmation strategies which can be assigned to different BOP segments.

As an example, FIG. 9 shows a list of attributes 900 sent to the LLM as part of the context prompt. The list of attributes 900 corresponds to the context table "Field Catalog for Condition Attributes" referenced in the prototype definition 600 of FIG. 6. These attributes represent possible characteristics of the BOP segments and are used to define conditions or filters when creating the BOP segments. Written in JSON format, the list of attributes 900 includes an object array, each representing a parameter-value pair. For example, the first object in the array has the parameter PRODALLOCCHARCCTLGPATHDESC with the value "Name of Person Responsible for Creating the Object." This means that one of the possible attributes for defining conditions in a BOP segment is the name of the person who created the object. Similarly, the second object has the same parameter PRODALLOCCHARCCTLGPATHDESC with a different value "Record Creation Date." This indicates that the date of record creation is another possible attribute for defining conditions in a BOP segment.

As described herein, the list of attributes 900 can be retrieved in runtime from database tables corresponding to the BOP segments. This dynamic retrieval process is significant as it allows for real-time customization and flexibility in defining the BOP segments based on the current state of the database tables. Importantly, this automatic runtime retrieval process is crucial due to the potentially large size of the attribute list and the diverse sources of the database tables. It ensures that the most accurate and up-to-date attribute information is used in the BOP and eliminates the potential for errors and inefficiencies that could arise from otherwise manual retrieval methods. Thus, this automatic retrieval process can significantly improve the efficiency and accuracy of BOP.

As another example, FIG. 10 shows a list of operators 1000 sent to the LLM as part of the context prompt. The list of operators 1000, represented in JSON format, can be paired with any of the selected attributes for defining conditions or filters in a BOP segment. Each operator is represented as a parameter-value pair, where the parameter ATPSELOPTNTOOLCOMPRNOPERATOR represents the operator code, and ATPSELOPTNTOOLCOMPRNOPTRTEXT provides a textual description of the operator. For example, the operator code 'BET' corresponds to the operation 'is between'.

As a further example, FIG. 11 shows a list of confirmation strategies 1100 sent to the LLM as part of the context prompt. The list of confirmation strategies 1100, represented in JSON format, is a set of confirmation strategies that can be assigned to any of the created BOP segments. Each confirmation strategy is represented as a parameter-value pair, where the parameter DOMNAME represents the domain name for the confirmation strategy, VALPOS represents the position of the value in the domain, DDLANGUAGE represents the language key, DOMVALUE_L represents the domain value of a confirmation strategy, DDTEXT provides a textual description of the confirmation strategy, etc. For example, the fourth ranked item in the list (VALPOS=4, and with the domain value 40) corresponds to the REDISTRIBUTE confirmation strategy.

Example Objects in Context Prompt Representing Chat Sessions

In some examples, the context prompt can further include example objects. An example object includes one or more example user prompts and corresponding output of the LLM generated in response to the one or more example user prompts. In other words, each example object represents a chat session or back-and-forth conversations between the user and the LLM. Incorporating example objects in the context prompt can improve the performance of the LLM because these example objects provide the LLM with a clear demonstration of expected behaviors. The example objects can also serve as a form of training data, enabling the LLM to learn and adapt over time, thereby improving its ability to generate relevant and accurate responses. Providing example objects in context prompt can also facilitate more natural and engaging conversations, as the LLM can reference these examples to follow the flow of the conversation more effectively.

Figure 13B:
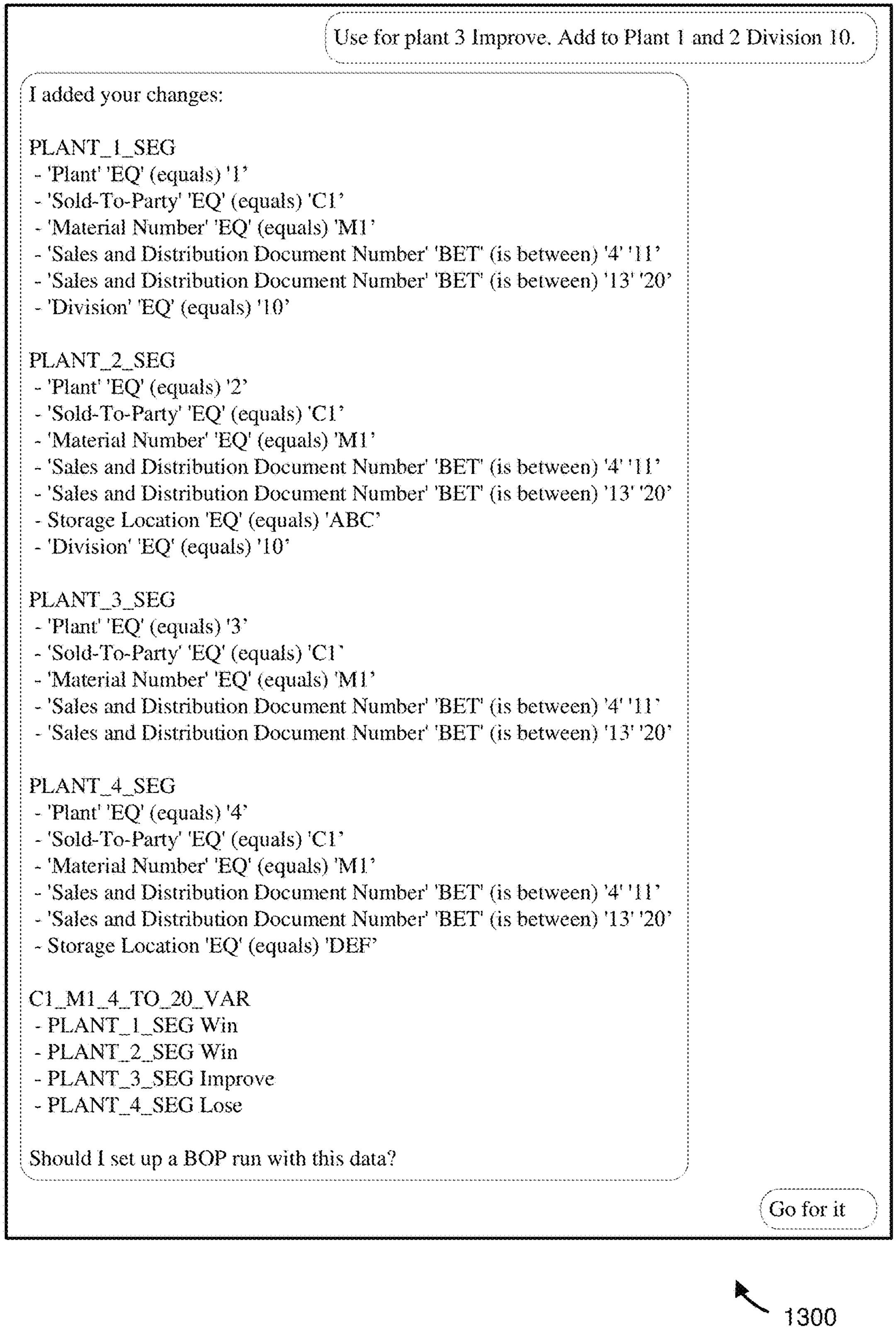
Figure 13C:
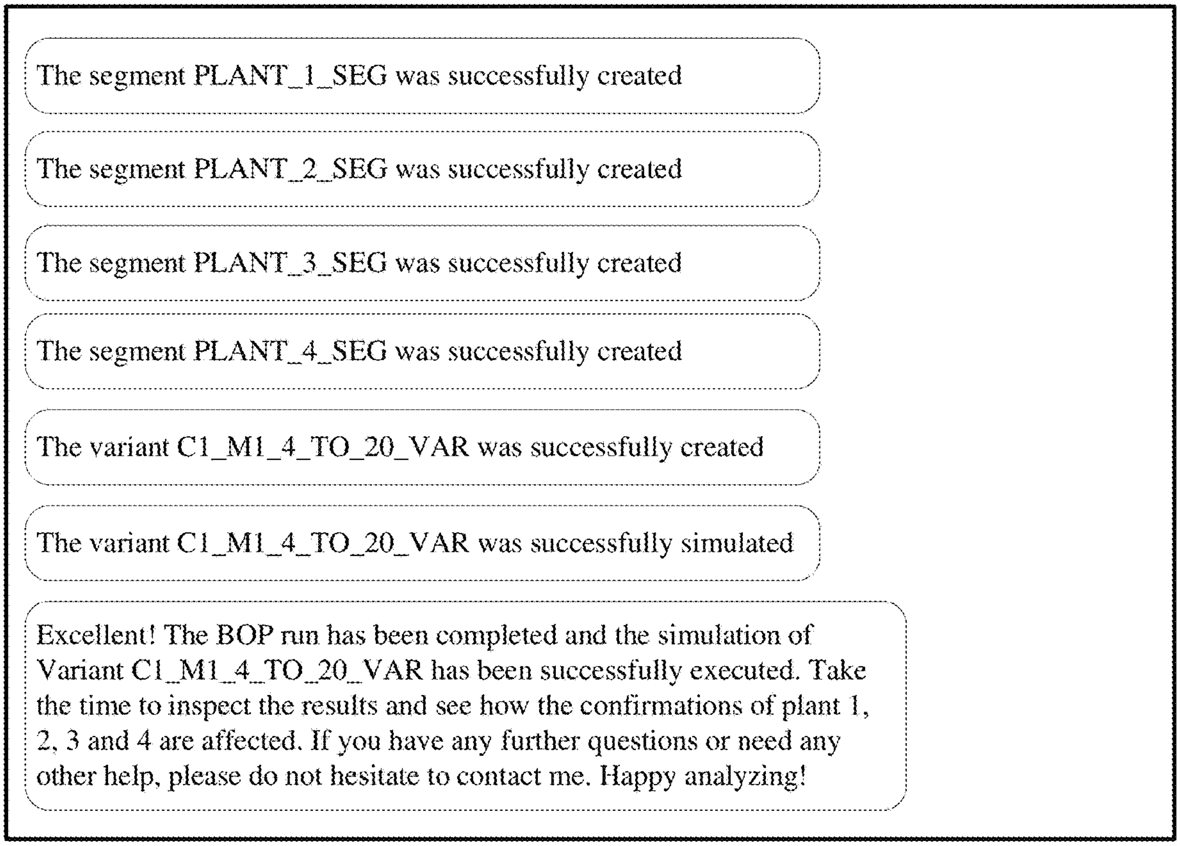

As an example, FIGS. 12A-12B depict an example object 1200 written in JSON format. An illustrative representation of the corresponding chat session 1300 is shown in FIGS. 13A-13C. This example chat session 1300 begins with the user providing specific requirements for renewing confirmations of various sales orders, specifying different conditions for different plants. The LLM responds by proposing a set of BOP segments and a BOP variant for the BOP run. The user then provides further instructions to modify the proposed setup, which the LLM incorporates and presents back to the user. Upon receiving the user's approval to proceed, the LLM executes the BOP run, creating the BOP segments and the BOP variant as per the user's instructions. The LLM then simulates the BOP run using the created BOP variant. Each step of the process is communicated back to the user, providing real-time updates on the progress of the BOP run. This example object 1200 demonstrates the fast-track approach for BOP, where the initial user prompt contains sufficient information to define a BOP run. Additional input from the user is used to either accept the recommendation and proceed with the BOP flow, or in this case, to change the recommended BOP setting (e.g., the confirmation strategy for plant 3 is changed from "Redistribute" to "Improve," and Division 10 is added to plants 1 and 2).

Figure 15C:
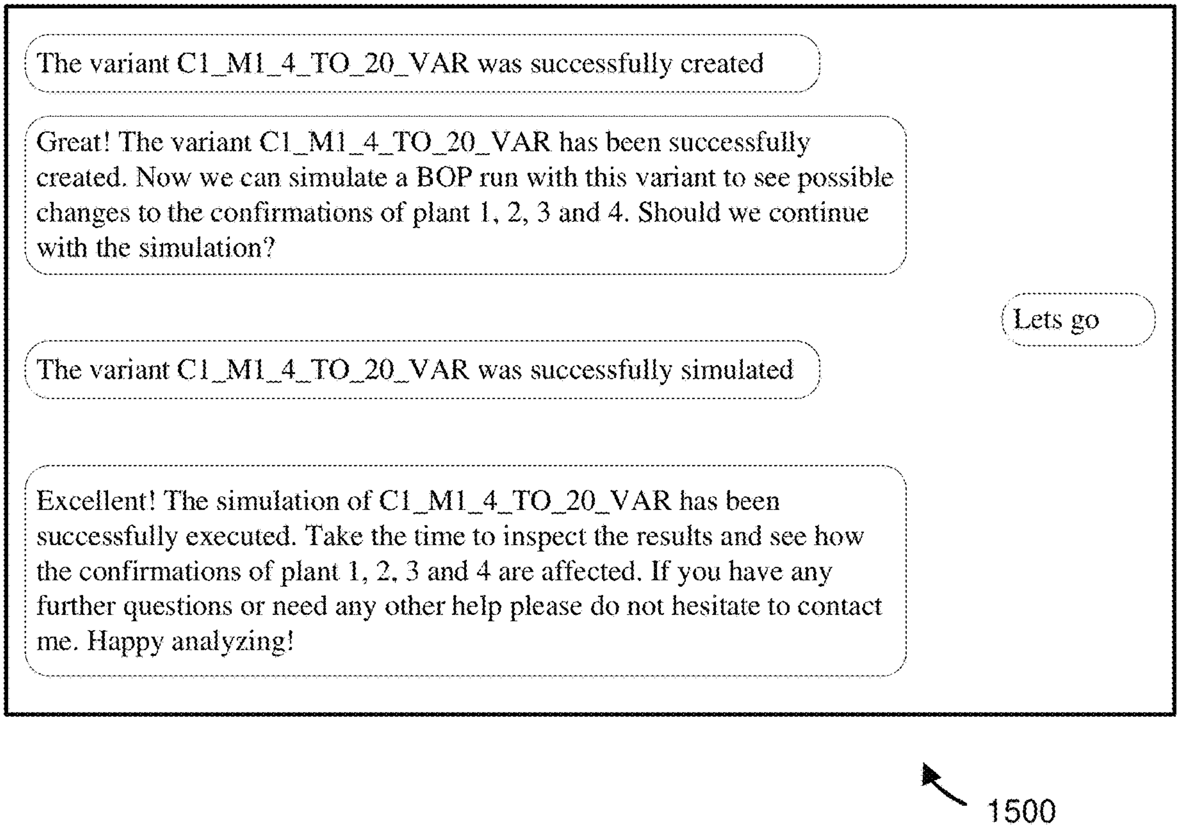

FIGS. 14A-14C show another example object 1400 written in JSON format. An illustrative representation of the corresponding chat session 1500 is shown in FIGS. 15A-15C. This example chat session 1500 begins with the user providing specific requirements for renewing confirmations of various sales orders, specifying different conditions for different plants. The LLM responds by proposing to guide the user through the process of setting up the BOP run. Upon receiving the user's agreement to proceed with the guided approach, the LLM starts by proposing the creation of a BOP segment for each plant, providing the conditions for each BOP segment and suggesting a name for it. After the user agrees to each proposal, the LLM creates the BOP segment and confirms its successful creation. Once all the BOP segments are created, the LLM proposes the creation of a BOP variant and the assignment of the BOP segments to respective confirmation strategies. After the user agrees to this proposal, the LLM creates the BOP variant and confirms its successful creation. The LLM then simulates the BOP run using the created BOP variant and confirms the successful simulation. This example object 1400 demonstrates the guided approach for BOP, where the LLM interacts with the user in a step-by-step manner to define the BOP run. This approach allows for a more interactive experience, giving the user the opportunity to provide input at each step of the process.

Example Use Case

Two example use cases (one using the guided approach, and another using the fast-track approach) are described herein to illustrate operation of AI-powered BOP.

Figure 16:
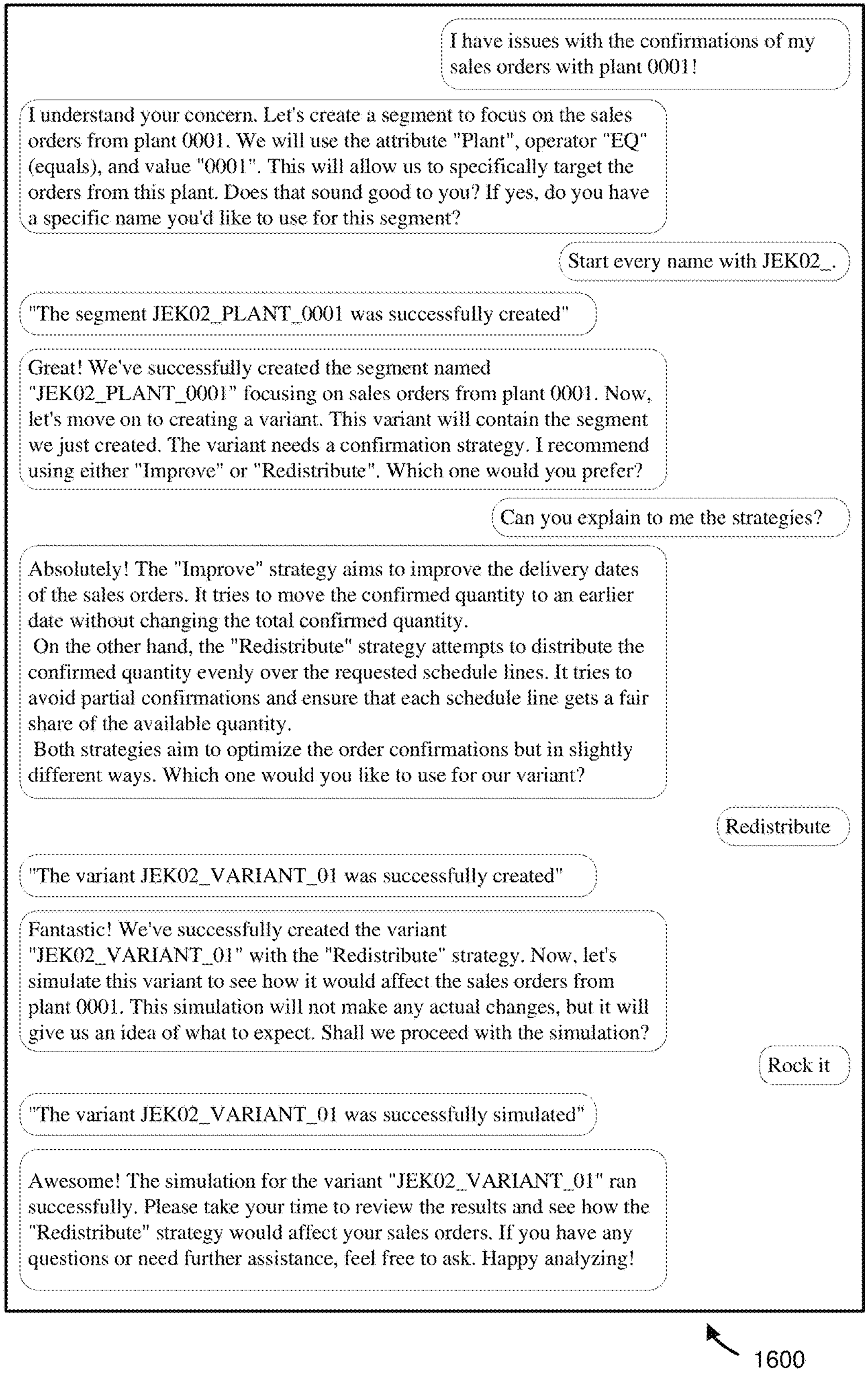
FIG. 16 depicts an example chat session of using AI-powered BOP.

In a first use case, FIG. 16 shows a chat session 1600 where a user sets up and executes a BOP run using a guided approach. The user initiates the chat session 1600 with a prompt about issues with sales order confirmations for plant 0001. The LLM, using the system prompt, recognizes that it should set up a BOP run for all sales orders associated with plant 0001. A BOP segment must first be created for this. The LLM recognizes from the setup that the BOP segment will have condition or filter that selects all sales orders with plant 0001. The LLM proposes a solution and seeks user consent before proceeding, as no actions should be carried out in the guided process without the user's consent. The LLM recognizes that the name of BOP segment, which is a necessary input parameter to create a BOP segment, is still missing. After querying the missing input parameter, the LLM is informed by another user prompt that all names should begin with a specific prefix. With this information, the LLM can execute a function call to create a BOP segment. The backend function call creates the BOP segment and returns a status message, which the LLM processes and communicates to the user.

Next, the LLM proposes creating a BOP variant to receive the new BOP segment and explains the need for a confirmation strategy. It also provides suggestions based on the problem definition and system prompt. In this example, the user asks the LLM to explain different confirmation strategies. In response, the LLM provides the explanations, followed by another request for the user to select a confirmation strategy, as this is a required input for creating a BOP variant. After the user selects "Redistribute" confirmation strategy, the LLM executes another function call to create a BOP variant (the previously user-defined prefix is reused for naming the BOP variant). The backend function call successfully creates the variant and returns a status message, which the LLM processes and communicates to the user.

Finally, the LLM proposes simulating the BOP run with the new BOP variant. After receiving the user's consent, the LLM executes a function call to simulate execution of the BOP variant and the results are returned to the user.

Figure 17A:
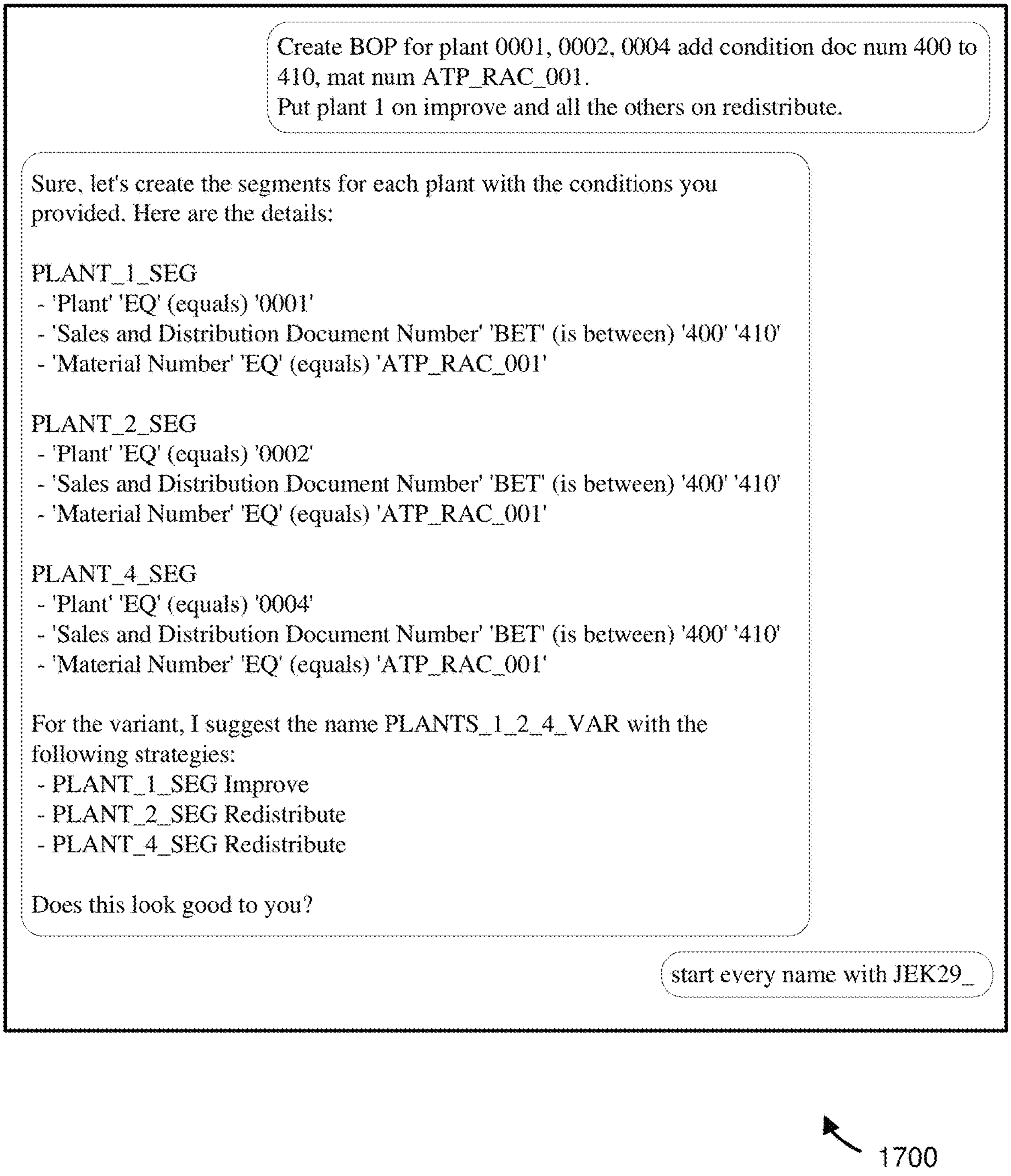
FIGS. 17A-17B depicts another example chat session of using AI-powered BOP.
Figure 17B:
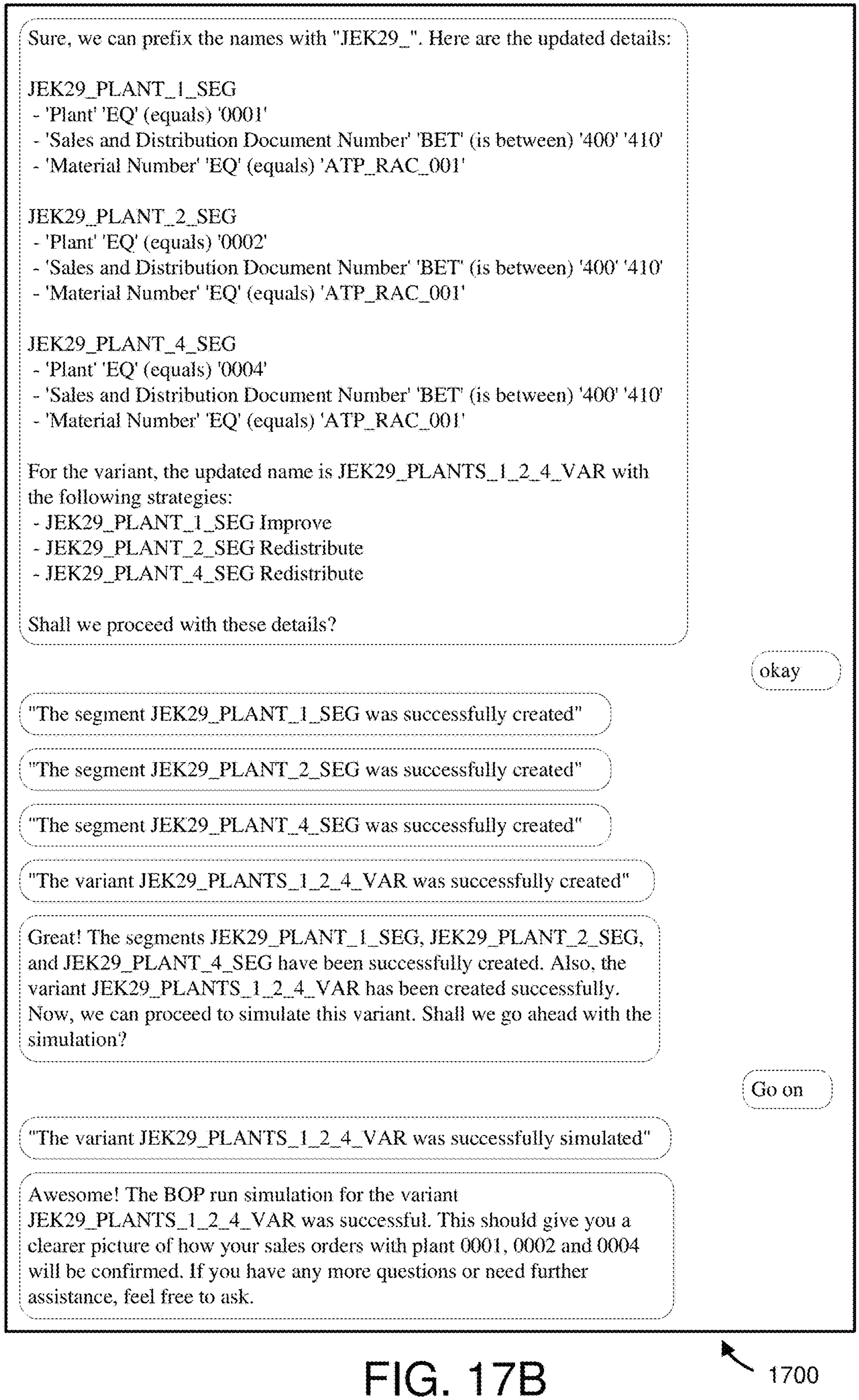

In a second use case, FIGS. 17A-17B show a chat session 1700 where a user sets up and executes a BOP run using a fast-track approach. In this example, the user initiates the chat session 1700 with a prompt with specific requirements for creating a BOP run for plants 0001, 0002, and 0004 with certain conditions. The LLM responds by proposing to create BOP segments for each plant with the provided conditions and suggests a name for the BOP variant along with the confirmation strategies for each BOP segment. Upon receiving the user's request to prefix all names with "JEK29_," the LLM updates the names of BOP segments and BOP variant accordingly and presents the updated details to the user. After the user's confirmation, the LLM executes corresponding function calls to create the BOP segments and the BOP variant. The backend function calls create the BOP segments and the BOP variant and return status messages indicating successful creation, which are processed and communicated to the user by the LLM. Next, the LLM proposes to simulate a BOP run. Upon receiving the user's consent, the LLM executes a function call in the backend to simulate the execution of the BOP variant, and the results of the simulation are returned to the user.

Example Advantages

The technologies described herein offer a multitude of advantages, particularly when compared to traditional approaches. As described above, in traditional ERP systems, users often face challenges navigating through multiple applications to configure BOP segments, create BOP variants, schedule BOP runs, etc. Each application requires users to manually translate their intentions into selection criteria and confirmation strategies. This process can be laborious and requires a comprehensive understanding of the various technical aspects of BOP. Inexperienced users may also incorrectly set up BOP, resulting in undesirable confirmation outcomes and potential errors. Indeed, particularly in time-sensitive scenarios, the conventional approach of setting up many BOP runs, each having many BOP segments with various filter settings, can prove impractical and error-prone.

The AI-powered solution disclosed herein offers a practical solution for complex BOP scenarios. It streamlines the intricate BOP workflow by using a chat interface to automate the setup and execution of BOP, thereby eliminating the need for users to navigate through multiple applications and manually configure each step. This high-level automation not only conserves time but also reduces the likelihood of errors, leading to a more efficient and effective order fulfillment process.

Specifically, by harnessing the power of AI, the disclosed technologies facilitate a more user-friendly and efficient approach to setting up and executing BOP, thereby overcoming many of the challenges and inefficiencies associated with traditional methods. Notably, all BOP function calls are performed in the backend of the ERP system, encapsulated by the BOP engine, which means the technical implementation of many BOP tasks are behind the scenes. The system can intelligently prompt the user to provide any missing information to set up the BOP and provides a detailed system prompt and rich context prompt (including automatic retrieval of attributes of BOP segments from database tables) to the LLM. This allows the LLM to accurately interpret the user's intent based on user prompts and perform proper BOP tasks.

Example Computing Systems

Figure 18:
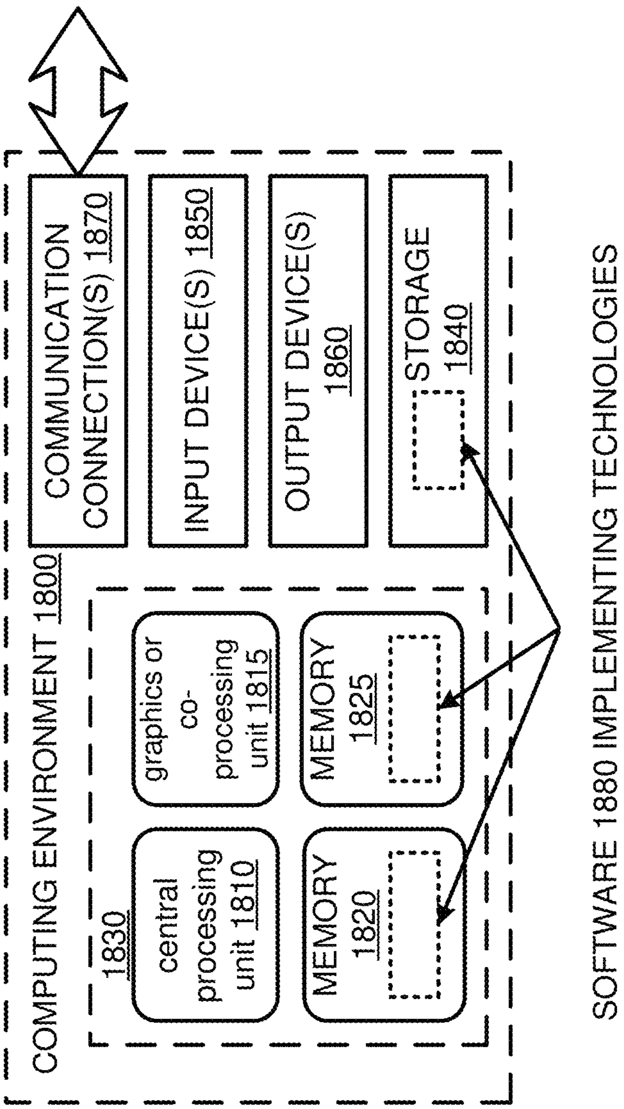
FIG. 18 is a block diagram of an example computing system in which described embodiments can be implemented.

FIG. 18 depicts an example of a suitable computing system 1800 in which the described innovations can be implemented. The computing system 1800 is not intended to suggest any limitation as to scope of use or functionality of the present disclosure, as the innovations can be implemented in diverse computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 18 shows a central processing unit 1810 as well as a graphics processing unit or co-processing unit 1815. The tangible memory 1820, 1825 can be volatile memory (e.g., registers, cache, RAM), non-volatile memory (e.g., ROM, EEPROM, flash memory, etc.), or some combination of the two, accessible by the processing unit(s) 1810, 1815. The memory 1820, 1825 can store software 1880 implementing one or more innovations described herein, in the form of computer-executable instructions suitable for execution by the processing unit(s) 1810, 1815.

A computing system 1800 can have additional features. For example, the computing system 1800 can include storage 1840, one or more input devices 1850, one or more output devices 1860, and one or more communication connections 1870, including input devices, output devices, and communication connections for interacting with a user. An interconnection mechanism (not shown) such as a bus, controller, or network can interconnect the components of the computing system 1800. Typically, operating system software (not shown) can provide an operating environment for other software executing in the computing system 1800, and coordinate activities of the components of the computing system 1800.

The tangible storage 1840 can be removable or non-removable, and includes magnetic disks, magnetic tapes or cassettes, CD-ROMs, DVDs, or any other medium which can be used to store information in a non-transitory way and which can be accessed within the computing system 1800. The storage 1840 can store instructions for the software implementing one or more innovations described herein.

The input device(s) 1850 can be an input device such as a keyboard, mouse, pen, or trackball, a voice input device, a scanning device, touch device (e.g., touchpad, display, or the like) or another device that provides input to the computing system 1800. The output device(s) 1860 can be a display, printer, speaker, CD-writer, or another device that provides output from the computing system 1800.

The communication connection(s) 1870 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 19:
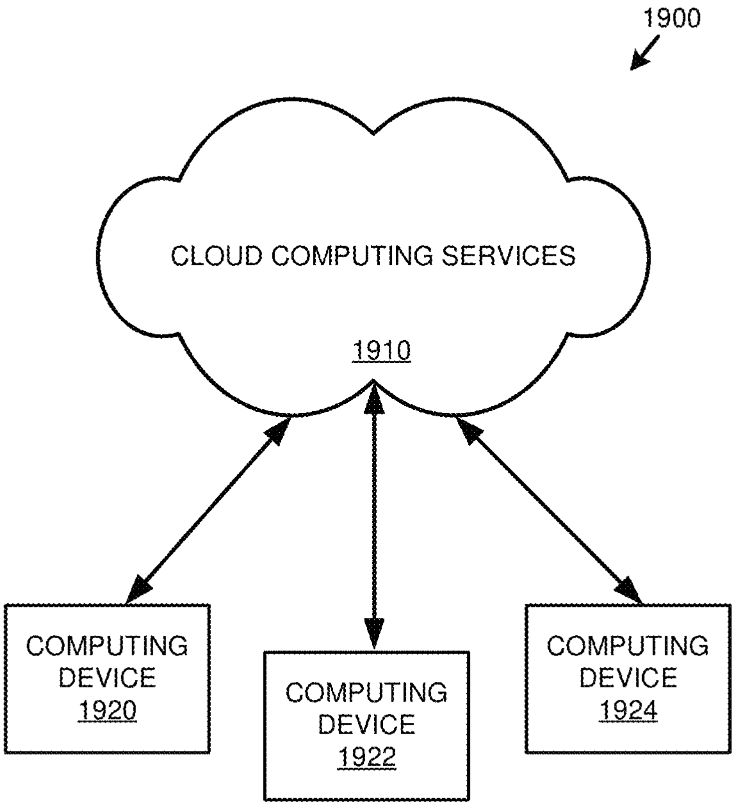
FIG. 19 is a block diagram of an example cloud computing environment that can be used in conjunction with the technologies described herein.

FIG. 19 depicts an example cloud computing environment 1900 in which the described technologies can be implemented, including, e.g., the system 100 and other systems herein. The cloud computing environment 1900 can include cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 can be utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. An enterprise resource planning (ERP) system for improved backorder processing (BOP), the ERP system comprising: memory; one or more hardware processors coupled to the memory; and one or more computer readable storage media storing instructions that, when loaded into the memory, cause the one or more hardware processors to perform operations comprising: receiving one or more user prompts from a user interface; creating, in runtime, a BOP segment using a large language model, wherein the BOP segment selects a subset of a plurality of order requirements using one or more filters determined based on the one or more user prompts, wherein a filter is defined by an attribute, an operator, and one or more attribute values; creating, in runtime, a BOP variant using the large language model, wherein the BOP variant defines a confirmation scheme for the BOP segment based on the one or more user prompts; and executing the BOP variant using the large language model, wherein the executing comprises batch processing the subset of the plurality of order requirements using the confirmation scheme.

Clause 2. The ERP system of clause 1, wherein the operations further comprise prompting, in runtime, the large language model with the one or more use prompts and a system prompt, wherein the system prompt defines a cardinality relationship between the BOP segment and the BOP variant.

Clause 3. The ERP system of clause 2, wherein the operations further comprise prompting, in runtime, the large language model with a context prompt, wherein the context prompt defines a plurality of confirmation schemes, one of which is defined for the BOP segment by the BOP variant.

Clause 4. The ERP system of clause 3, wherein the context prompt comprises prototype definitions of functions for creating the BOP segment, creating the BOP variant, and executing the BOP variant, respectively. [context prompt: function call definitions]

Clause 5. The ERP system of clause 4, wherein the system prompt is configured to instruct the large language model to sequentially invoke the functions for creating the BOP segment, creating the BOP variant, and executing the BOP variant in backend.

Clause 6. The ERP system of any one of clauses 4-5, wherein the system prompt is configured to instruct the large language model to identify missing input values of the functions and request the missing input values from the user interface.

Clause 7. The ERP system of any one of clauses 3-6, wherein the context prompt comprises a list of attributes, from which attributes are selected to define the one or more filters, wherein the operations further comprise retrieving, in runtime, the list of attributes from database tables corresponding to the BOP segment.

Clause 8. The ERP system of any one of clauses 3-7, wherein the context prompt comprises a list of operators, from which operators are selected to define the one or more filters.

Clause 9. The ERP system of any one of clauses 3-8, wherein the context prompt comprises one or more structured objects, wherein a structured object comprises one or more example user prompts and corresponding output of the large language model generated in response to the one or more example user prompts.

Clause 10. The ERP system of any one of clauses 3-9, wherein the context prompt comprises one or more configuration parameters of the large language model.

Clause 11. A computer-implemented method for improved backorder processing (BOP) in an enterprise resource planning (ERP) system, the method comprising: receiving one or more user prompts from a user interface; creating, in runtime, a BOP segment using a large language model, wherein the BOP segment selects a subset of a plurality of order requirements using one or more filters determined based on the one or more user prompts, wherein a filter is defined by an attribute, an operator, and one or more attribute values; creating, in runtime, a BOP variant using the large language model, wherein the BOP variant defines a confirmation scheme for the BOP segment based on the one or more user prompts; and executing the BOP variant using the large language model, wherein the executing comprises batch processing the subset of the plurality of order requirements using the confirmation scheme.

Clause 12. The computer-implemented method of clause 11, wherein the operations further comprise prompting, in runtime, the large language model with the one or more use prompts and a system prompt, wherein the system prompt defines a cardinality relationship between the BOP segment and the BOP variant.

Clause 13. The computer-implemented method of clause 12, wherein the operations further comprise prompting, in runtime, the large language model with a context prompt, wherein the context prompt defines a plurality of confirmation schemes, one of which is defined for the BOP segment by the BOP variant.

Clause 14. The computer-implemented method of clause 13, wherein the context prompt comprises prototype definitions of functions for creating the BOP segment, creating the BOP variant, and executing the BOP variant, respectively.

Clause 15. The computer-implemented method of clause 14, wherein the system prompt is configured to instruct the large language model to sequentially invoke the functions for creating the BOP segment, creating the BOP variant, and executing the BOP variant in backend.

Clause 16. The computer-implemented method of any one of clauses 13-15, wherein the context prompt comprises a list of attributes, from which attributes are selected to define the one or more filters, wherein the operations further comprise retrieving, in runtime, the list of attributes from database tables corresponding to the BOP segment.

Clause 17. The computer-implemented method of any one of clauses 13-16, wherein the context prompt comprises a list of operators, from which operators are selected to define the one or more filters.

Clause 18. The computer-implemented method of any one of clauses 13-17, wherein the context prompt comprises one or more structured objects, wherein a structured object comprises one or more example user prompts and corresponding output of the large language model generated in response to the one or more example user prompts.

Clause 19. The computer-implemented method of any one of clauses 13-18, wherein the context prompt comprises one or more configuration parameters of the large language model.

Clause 20. One or more non-transitory computer-readable media having encoded thereon computer-executable instructions causing one or more processors to perform a method for improved backorder processing (BOP) in an enterprise resource planning (ERP) system, the method comprising: receiving one or more user prompts from a user interface; creating, in runtime, a BOP segment using a large language model, wherein the BOP segment selects a subset of a plurality of order requirements using one or more filters determined based on the one or more user prompts, wherein a filter is defined by an attribute, an operator, and one or more attribute values; creating, in runtime, a BOP variant using the large language model, wherein the BOP variant defines a confirmation scheme for the BOP segment based on the one or more user prompts; and executing the BOP variant using the large language model, wherein the executing comprises batch processing the subset of the plurality of order requirements using the confirmation scheme.

Example Alternatives

It should be noted that the technologies descried herein that leverage API metadata for intelligent user query answering are merely exemplary, and alternative approaches can be taken. For example, one alternative could be using UI metadata, which can be mapped to natural language input from the user. Automation tools like Selenium could be used to automate the navigation process to a given page and UI element. A hybrid approach of using both APIs and UI could also be considered, where the source of information can be determined optimally considering several factors. For instance, while retrieving answers via UI could be performance intensive, APIs could be the default choice for answering queries. If the user is already on the same UI page which has the context to the user's query, it might be useful to answer the question directly via the UI element on the page. For navigation related queries or rendering complex user interfaces like graphs, pie charts, etc., within the chat interface, intelligent UI based navigation or direct rendering of the UI element within the chat interface could be used.

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. An enterprise resource planning (ERP) system for improved backorder processing (BOP), the ERP system comprising:

memory;

one or more hardware processors coupled to the memory;

an available-to-promise (ATP) module comprising a BOP engine having a segment creator accessible through a first application programming interface (API), a variant creator accessible through a second API, and an executor accessible through a third API; and one or more computer readable storage media storing instructions that, when loaded into the memory, cause the one or more hardware processors to perform operations comprising:

receiving one or more user prompts from a user interface;

prompting, in runtime, a large language model with the one or more user prompts, a system prompt, and a context prompt, wherein:

the context prompt comprises prototype definitions of a first backend function, a second backend function, and a third backend function;

the prototype definitions of the first, second, and third backend functions specify, respectively, a first structured input for invoking the first backend function, a second structured input for invoking the second backend function, and a third structured input for invoking the third backend function; and the system prompt instructs the large language model to sequentially invoke the first backend function, the second backend function, and the third backend function;

for each of the first, second, and third backend functions, before invoking the respective backend function:

determining, using the large language model and based on the corresponding prototype definition, whether values sufficient to form the corresponding structured input are available to the large language model;

responsive to determining that values available to the large language model are insufficient to form the corresponding structured input, requesting, using the large language model, one or more additional values through the user interface; and after values sufficient to form the corresponding structured input are available to the large language model, forming the corresponding structured input;

causing the large language model to invoke, via the first API and with the first structured input, the first backend function, thereby causing the segment creator to create, in runtime, a BOP segment, wherein the BOP segment selects a subset of a plurality of order requirements using one or more filters determined based on the one or more user prompts, wherein a filter is defined by an attribute, an operator, and one or more attribute values;

causing the large language model to invoke, via the second API and with the second structured input, the second backend function, thereby causing the variant creator to create, in runtime, a BOP variant, wherein the BOP variant defines a confirmation scheme for the BOP segment based on the one or more user prompts; and causing the large language model to invoke, via the third API and with the third structured input, the third backend function, thereby causing the executor to execute the BOP variant, wherein execution of the BOP variant comprises batch processing the subset of the plurality of order requirements using the confirmation scheme, wherein the batch processing comprises performing availability checks for the subset of the plurality of order requirements and adjusting order confirmations for the subset according to the confirmation scheme.

2. The ERP system of claim 1, wherein the system prompt defines a cardinality relationship between the BOP segment and the BOP variant.

3. The ERP system of claim 1, wherein the context prompt defines a plurality of confirmation schemes, and wherein the confirmation scheme defined by the BOP variant for the BOP segment is selected from the plurality of confirmation schemes.

4. The ERP system of claim 1, wherein:

the first structured input comprises a segment name identifying the BOP segment and one or more criteria;

the second structured input comprises a variant name identifying the BOP variant and at least one combination of the segment name and a confirmation scheme; and the third structured input comprises the variant name.

5. The ERP system of claim 1, wherein the context prompt comprises a list of attributes, from which an attribute is selected for each of the one or more filters, wherein the operations further comprise retrieving, in runtime, the list of attributes from database tables corresponding to BOP segments.

6. The ERP system of claim 1, wherein the context prompt comprises a list of operators, from which an operator is selected for each of the one or more filters.

7. The ERP system of claim 1, wherein the context prompt comprises one or more structured objects, wherein each structured object comprises one or more example user prompts and respective outputs generated by the large language model in response to the one or more example user prompts.

8. The ERP system of claim 1, wherein the context prompt comprises one or more configuration parameters of the large language model.

9. A computer-implemented method for improved backorder processing (BOP) in an enterprise resource planning (ERP) system comprising an available-to-promise (ATP) module having a BOP engine, the BOP engine comprising a segment creator accessible through a first application programming interface (API), a variant creator accessible through a second API, and an executor accessible through a third API, the method comprising:

receiving one or more user prompts from a user interface;

prompting, in runtime, a large language model with the one or more user prompts, a system prompt, and a context prompt, wherein:

the context prompt comprises prototype definitions of a first backend function, a second backend function, and a third backend function;

the prototype definitions of the first, second, and third backend functions specify, respectively, a first structured input for invoking the first backend function, a second structured input for invoking the second backend function, and a third structured input for invoking the third backend function; and the system prompt instructs the large language model to sequentially invoke the first backend function, the second backend function, and the third backend function;

for each of the first, second, and third backend functions, before invoking the respective backend function:

determining, using the large language model and based on the corresponding prototype definition, whether values sufficient to form the corresponding structured input are available to the large language model;

responsive to determining that values available to the large language model are insufficient to form the corresponding structured input, requesting, using the large language model, one or more additional values through the user interface; and after values sufficient to form the corresponding structured input are available to the large language model, forming the corresponding structured input;

causing the large language model to invoke, via the first API and with the first structured input, the first backend function, thereby causing the segment creator to create, in runtime, a BOP segment, wherein the BOP segment selects a subset of a plurality of order requirements using one or more filters determined based on the one or more user prompts, wherein a filter is defined by an attribute, an operator, and one or more attribute values;

causing the large language model to invoke, via the second API and with the second structured input, the second backend function, thereby causing the variant creator to create, in runtime, a BOP variant, wherein the BOP variant defines a confirmation scheme for the BOP segment based on the one or more user prompts; and causing the large language model to invoke, via the third API and with the third structured input, the third backend function, thereby causing the executor to execute the BOP variant, wherein execution of the BOP variant comprises batch processing the subset of the plurality of order requirements using the confirmation scheme, wherein the batch processing comprises performing availability checks for the subset of the plurality of order requirements and adjusting order confirmations for the subset according to the confirmation scheme.

10. The computer-implemented method of claim 9, wherein the system prompt defines a cardinality relationship between the BOP segment and the BOP variant.

11. The computer-implemented method of claim 9, wherein the context prompt defines a plurality of confirmation schemes, and wherein the confirmation scheme defined by the BOP variant for the BOP segment is selected from the plurality of confirmation schemes.

12. The computer-implemented method of claim 9, wherein:

the first structured input comprises a segment name identifying the BOP segment and one or more criteria;

the second structured input comprises a variant name identifying the BOP variant and at least one combination of the segment name and a confirmation scheme; and the third structured input comprises the variant name.

13. The computer-implemented method of claim 9, wherein the context prompt comprises a list of an attribute is selected for each of the one or more filters, wherein the method further comprises retrieving, in runtime, the list of attributes from database tables corresponding to BOP segments.

14. The computer-implemented method of claim 9, wherein the context prompt comprises a list of operators, from which an operator is selected for each of the one or more filters.

15. The computer-implemented method of claim 9, wherein the context prompt comprises one or more structured objects, wherein each structured object comprises one or more example user prompts and respective outputs generated by the large language model in response to the one or more example user prompts.

16. The computer-implemented method of claim 9, wherein the context prompt comprises one or more configuration parameters of the large language model.

17. One or more non-transitory computer-readable media having encoded thereon computer-executable instructions causing one or more processors to perform a method for improved backorder processing (BOP) in an enterprise resource planning (ERP) system comprising an available-to-promise (ATP) module having a BOP engine, the BOP engine comprising a segment creator accessible through a first application programming interface (API), a variant creator accessible through a second API, and an executor accessible through a third API, the method comprising:

receiving one or more user prompts from a user interface;

prompting, in runtime, a large language model with the one or more user prompts, a system prompt, and a context prompt, wherein:

the context prompt comprises prototype definitions of a first backend function, a second backend function, and a third backend function;

the prototype definitions of the first, second, and third backend functions specify, respectively, a first structured input for invoking the first backend function, a second structured input for invoking the second backend function, and a third structured input for invoking the third backend function; and the system prompt instructs the large language model to sequentially invoke the first backend function, the second backend function, and the third backend function;

for each of the first, second, and third backend functions, before invoking the respective backend function:

determining, using the large language model and based on the corresponding prototype definition, whether values sufficient to form the corresponding structured input are available to the large language model;

responsive to determining that values available to the large language model are insufficient to form the corresponding structured input, requesting, using the large language model, one or more additional values through the user interface; and after values sufficient to form the corresponding structured input are available to the large language model, forming the corresponding structured input;

causing the large language model to invoke, via the first API and with the first structured input, the first backend function, thereby causing the segment creator to create, in runtime, a BOP segment, wherein the BOP segment selects a subset of a plurality of order requirements using one or more filters determined based on the one or more user prompts, wherein a filter is defined by an attribute, an operator, and one or more attribute values;

causing the large language model to invoke, via the second API and with the second structured input, the second backend function, thereby causing the variant creator to create, in runtime, a BOP variant, wherein the BOP variant defines a confirmation scheme for the BOP segment based on the one or more user prompts; and causing the large language model to invoke, via the third API and with the third structured input, the third backend function, thereby causing the executor to execute the BOP variant, wherein execution of the BOP variant comprises batch processing the subset of the plurality of order requirements using the confirmation scheme, wherein the batch processing comprises performing availability checks for the subset of the plurality of order requirements and adjusting order confirmations for the subset according to the confirmation scheme.

* * * * *